(12) United States Patent
Kitabayashi

(10) Patent No.: US 7,055,970 B2
(45) Date of Patent: Jun. 6, 2006

(54) OPTICAL APPARATUS AND PROJECTOR

(75) Inventor: Masashi Kitabayashi, Horigane-mura (JP)

(73) Assignee: Seiko Epson Corporation, Tokyo (JP)

( * ) Notice: Subject to any disclaimer, the term of this patent is extended or adjusted under 35 U.S.C. 154(b) by 95 days.

(21) Appl. No.: 10/948,299

(22) Filed: Sep. 24, 2004

(65) Prior Publication Data

US 2005/0105063 A1 May 19, 2005

(30) Foreign Application Priority Data

Sep. 24, 2003 (JP) ............................. 2003-331576

(51) Int. Cl.
*G03B 21/14* (2006.01)

(52) U.S. Cl. ..................... 353/100; 353/101; 353/119

(58) Field of Classification Search .................. 353/31, 353/33, 34, 37, 100, 101, 119; 349/5, 7, 349/8, 58

See application file for complete search history.

(56) References Cited

U.S. PATENT DOCUMENTS

| | | |
|---|---|---|
| 6,854,848 B1 * | 2/2005 | Fujimori et al. ............... 353/20 |
| 6,961,165 B1 * | 11/2005 | Uehara ........................ 359/237 |
| 6,981,772 B1 * | 1/2006 | Kim ............................. 353/81 |
| 2002/0180895 A1 | 12/2002 | Choi |
| 2003/0025844 A1 * | 2/2003 | Suzuki .......................... 349/5 |
| 2005/0117127 A1 * | 6/2005 | Jang ........................... 353/100 |

FOREIGN PATENT DOCUMENTS

| | | |
|---|---|---|
| JP | A 2001-222081 | 8/2001 |
| JP | A 2003-075696 | 3/2003 |
| JP | A 2003-202479 | 7/2003 |

* cited by examiner

*Primary Examiner*—William C. Dowling
(74) *Attorney, Agent, or Firm*—Oliff & Berridge, PLC

(57) ABSTRACT

Aspects of the invention can provide an optical apparatus having a supporting portion of an enclosure for optical components that is formed with a groove which is reduced in width in the opposite direction from the extending direction of the supporting portion, that is, toward a curved portion. A flange of a projection lens to be installed on the supporting portion can be formed with a notch. Postural adjustment of the projection lens can be performed according to a projecting image which is projected on rear screens from the projecting lens. When a flat-head screwdriver is inserted into the notch and the groove and is turned, the flat-head screwdriver can come into abutment with the peripheral edge of the notch of the flange of the projection lens and the peripheral edge of the groove of the supporting portion. Accordingly, the flange of the projection lens can move on the supporting portion and the postural adjustment of the projection lens can be achieved.

12 Claims, 15 Drawing Sheets

OPTICAL APPARATUS AND PROJECTOR

BACKGROUND OF INVENTION

1. Technical Field of Invention

Aspects of the invention can relate to an optical apparatus and a projector. The optical apparatus of the invention can be used for a projector which is widely used in multimedia presentation, such as conferences, colloquiums, exhibitions.

2. Description of Related Art

Related art projectors can include a plurality of light modulating devices for modulating a plurality of colored lights by each color according to image information, a color combining system for combining a colored light modulated by each light modulating device, and a projection system which projects luminous flux combined by the color combining system in an enlarged manner and forms a projection image is utilized. In such a projector, the respective light modulating devices can be configured as an electric optical device by being fixed integrally to end surfaces of the color combining system on the luminous flux incident-sides thereof (POP (Panel On Prism) structure). Then, the electric optical device can be, as stated in JP-A-2003-75696 (FIGS. 6, 7) for example, fixed to an enclosure (base member) for optical components having the projection system mounted thereto.

In such a related art projector, an electric optical device is manufactured in advance, and then the manufactured electric optical device is stored in and fixed to the interior of the enclosure for the optical components. When manufacturing the electric optical device, a master lens can be used as a standard projection system, and luminous flux passed through the electric optical device and the master lens is projected on a screen, whereby the position of fixation of the light modulating device with respect to the color combining system is adjusted (a master lens system).

However, in such a master lens system, since there exist deviations, such as a state of an image surface at a back-focus position or an axial chromatic aberration between the projection system mounted actually to the enclosure for optical components and the master lens, even when the electric optical device is manufactured with high degree of accuracy using the master lens, there was a problem such that a clear image cannot necessarily be obtained depending on the projection system to be combined.

SUMMARY OF THE INVENTION

An exemplary method including the steps of mounting the projection system to the projector, adjusting the position to fix the electric optical device to the enclosure for optical components, and adjusting focus is considered. However, in this case, since the electric optical device moves to directions other than the focusing direction when adjusting the position, the accuracy of the optical axis is deteriorated, and hence the brightness performance of the projector may be lowered.

An aspect of the invention can be to provide an optical apparatus and a projector which can project an optimum image without causing deterioration of the accuracy of the optical axis.

An exemplary optical apparatus of the invention can be an optical apparatus including an electric optical device having a plurality of light modulating device for modulating a plurality of colored lights according to image information and a color combining system for combining the colored lights modulated by the respective light modulating devices, and a projection system for projecting luminous flux combined by the color combining system of the electric optical device in an enlarged manner for forming a projection image. The optical apparatus can further include a base member to which the electric optical device is fixed and the projection system is mounted. The projection system can include a lens barrel for storing a lens and having a flange extending outwardly so as to be substantially orthogonal to the direction of the optical axis of the lens, the base member extends along the flange of the lens barrel of the projection system and includes a supporting portion for supporting the flange. One of the flange and the supporting portion can be formed with a hole through which the screwing shaft of a screwing member for fixing the flange and the supporting portion and having a larger diameter than the diameter of the screwing shaft. One of the flange and the supporting portion can be formed with a pierced portion penetrating between the surface opposing to the other one of the flange and the supporting portion and the surface on the other side thereof, the other one of the flange and the supporting portion is formed with a groove which communicates with the pierced portion, a rod-shaped adjusting member is inserted into the pierced portion and the groove, the adjusting member comes into abutment with the pierced portion or the groove formed at least on the flange, and the flange slides on the supporting portion.

The rod-shaped adjusting member may be a tool, such as a screwdriver, for example.

The pierced portion may take any form as long as it penetrates an opposing surface and the surface on the opposite side from the opposing surface, and may be a through hole or a notch.

According to the invention as described above, one of the flange and the supporting portion can be formed with the pierced portion penetrating the surface opposing to the other one of the flange and the supporting portion and the surface on the other side thereof, an the other one of the flange and the supporting portion is formed with the groove which communicates with the pierced portion. The flange can be slid on the supporting member by inserting the rod-shaped adjusting member into the pierced portion and the groove and bringing the adjusting member into abutment with the pierced portion or the groove formed at least on the flange. Therefore, by projecting a projecting image from the projecting system and sliding the flange of the projection system on the supporting portion of the base member based on the projection image, the postural adjustment of the projection system can be achieved.

When performing the postural adjustment, the screwing member slides in a hole having a larger diameter than the screwing member formed on the flange or the supporting portion. After having adjusted the posture as described above, the projection system can be fixed to the base member by fixing the flange and the supporting portion by means of the screwing members.

As described thus far, according to the invention, the projection system can be fixed at a position where the optimal projection image is obtained by performing the postural adjustment of the projection system, and hence improvement of the quality of the image can be achieved.

Also, since the projection system can be fixed at a position where the optimal projection image is obtained by performing the postural adjustment of the projection system, improvement of the image quality is ensured even when the electric optical device mass-produced via a master lens system is used.

Moreover, since the optical apparatus of the invention has a structure in which the postural adjustment of the projection system can be performed, and not a structure in which the position to fix the electric optical device is adjusted, deterioration of the accuracy of the optical axis due to the displacement of the electric optical device can be prevented. Also, since one of the supporting portion of the base member and the flange of the projection system is formed with the pierced portion, the other one is formed with the groove, and the adjusting member can be inserted into the pierced portion and the groove when performing the postural adjustment of the projection system, movement of the adjusting member is constrained, and hence the excessive movement of the adjusting member is prevented. Accordingly, fine adjustment of the projection system is enabled.

According to the present invention, preferably, the flange is formed with the pierced portion, the supporting portion is formed with the groove, and the width of the pierced portion viewed from the side of the front surface of the flange is reduced toward the extending direction of the flange or toward the opposite direction therefrom, and the width of the groove viewed from the side of the front surface of the flange is reduced toward the direction opposite from the extending direction of the supporting portion or toward the extending direction thereof.

When the width of the pierced portion formed on the flange is reduced along the extending direction of the flange, the width of the groove should be reduced toward the direction opposite from the extending direction of the supporting portion. In contrast, when the width of the pierced portion is reduced along the direction opposite from the extending direction of the flange, the width of the groove should be reduced along the extending direction of the supporting portion.

According to the invention as described thus far, since the width of the pierced portion is reduced toward the extending direction of the flange, and the width of the groove is reduced toward the direction opposite from the extending direction of the supporting portion, the width of a space defined by the pierced portion and the groove is smallest at the end on the extending side and at the opposite end thereof when viewed from the side of the front surface of the flange and is gradually increased toward the intersection of the peripheral edge of the pierced portion and the peripheral edge of the groove. Likewise, in the case where the width of the pierced portion is reduced toward the opposite direction from the extending direction of the flange and the width of the groove is reduced toward the extending direction of the supporting portion, the width of a space defined by the pierced portion and the groove is smallest at the end on the extending side and at the opposite end thereof when viewed from the side of the front surface of the flange, and is increased gradually toward the intersection of the peripheral edge of the pierced portion and the peripheral edge of the groove.

A tip of the adjusting member, for example, a flat-head screwdriver, can be inserted into the space defined by the pierced portion and the groove as described above. At this time, the elongated direction of the end surface of the tip of the adjusting member is oriented to extend along the extending direction of the supporting portion and the flange. Then, when the flat-head screwdriver or the like is turned, the flat-head screwdriver or the like comes into abutment with the peripheral edge of the pierced portion. Accordingly, the flange of the projection lens slides on the supporting portion, whereby the postural adjustment of the projection lens is achieved.

As described above, according to the invention, since the postural adjustment can be achieved by turning the flat-head screwdriver or the like as the adjusting member, the postural adjustment can be achieved easily.

Also, according to the invention, a structure in which the pierced portion is formed on the flange, and the groove having a width along the optical axis of the projection system (a width orthogonal to the extending direction of the supporting portion and the inserting direction of the adjusting member) smaller than the width of the pierced portion along the optical axis of the projection system is formed on the supporting portion is also applicable.

According to the invention as described above, an adjusting member, such as the flat-head screwdriver or the like, can be inserted into the groove and the pierced portion and the flat-head screwdriver or the like is inclined substantially along the direction of the optical axis of the projection system in a state in which the tip of the flat-head screwdriver or the like is inserted into the groove, and the flat-head screwdriver or the like is brought into abutment with the peripheral edge of the pierced portion. Since the width of the groove along the direction of the optical axis of the projection system is smaller than the width of the pierced portion, when the flat-head screwdriver or the like inserted into the groove is inclined, the tip of the flat-head screwdriver or the like comes into abutment with the peripheral edge of the groove. Then, the point of abutment can serve as a fulcrum, and hence a force from the screwdriver is exerted to the peripheral edge of the pierced portion.

Accordingly, the flange of the projection system can be slid on the supporting portion, so that the postural adjustment can be achieved.

As described above, since the postural adjustment of the projection system is achieved only by inclining the adjusting member such as the flat-head driver, the position can easily be adjusted.

Furthermore, according to the invention, a spacer formed substantially into a wedge shape is preferably interposed between the flange and the supporting portion of the base member. According to the invention as described above, since the spacer formed substantially into the wedge shape is interposed between the flange and the supporting portion, the postural adjustment of the projection system in the tilting direction (in the direction of the height) can be achieved by moving the spacer on the supporting portion. Accordingly, variations in image surfaces of the projecting images can be corrected.

The invention may also includes a push-screw which comes into abutment with the supporting portion of the base member at one end and is screwed into a screw hole formed on the flange at the other end, and the screwing member may be a drawing thread which is screwed into the screw hole formed on the supporting portion of the base member at one end and is engaged with the flange at the other end. According to the invention as described above, the position in height of the flange from the base member can be adjusted by adjusting the projecting amount of the push-screw from the flange and the screwing amount of the drawing thread into the base member. Accordingly, the postural adjustment of the projection system in the tilting direction can be achieved, and hence variations in image surfaces of the projecting images can be corrected.

In this case, preferably, the surface of the flange opposing to the supporting portion of the base member includes a pair of inclined surfaces inclining toward the supporting portion from the front end in the direction of projection and the rear end in the direction of projection of the opposing surface to the center thereof, respectively.

In the invention as described above, the surface of the flange opposing to the supporting portion constitute a pair of inclined surfaces, and the distance from the distal side and the proximal side in the projecting direction to the supporting portion is larger than the distance from the center of the opposing surface to the supporting portion. Therefore, even when the flange is inclined toward the distal side and the proximal side in the projecting direction, the flange can hardly come in touch with the supporting portion, whereby the inclination of the projecting lens can be adjusted.

A projector of the invention is characterized by being provided with any one of the aforementioned types of the optical apparatus. According to the present invention as described above, since one of the aforementioned types of the optical apparatus is provided, the same effect as the optical apparatus can be achieved. In other words, a projector which can project optimal images without deteriorating the accuracy of the optical axis is achieved.

BRIEF DESCRIPTION OF THE DRAWINGS

The invention will be described with reference to the accompanying drawings, wherein like numerals reference like elements, and wherein.

DETAILED DESCRIPTION OF EMBODIMENTS

Figure 1:
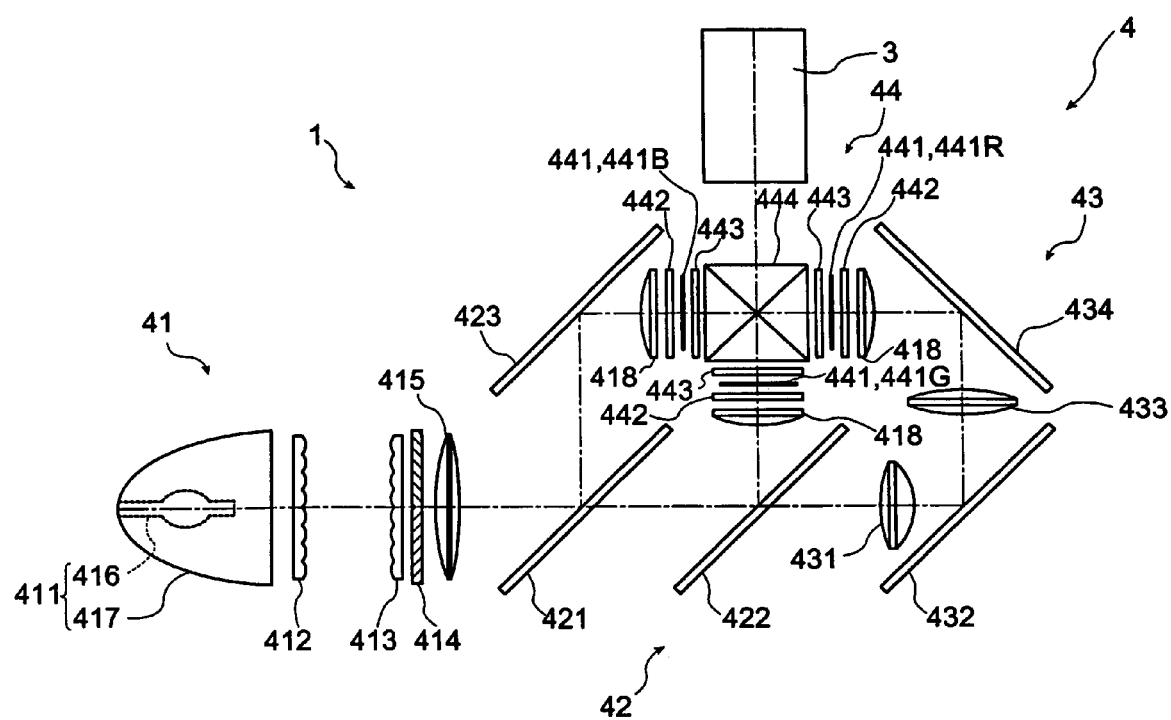
FIG. 1 is a pattern diagram showing an optical system of a projector according to a first exemplary embodiment of the invention.

Referring now to the drawings, a first exemplary embodiment of the invention will be described.

FIG. 1 is a pattern diagram of an optical system 4 of a projector 1 according to the exemplary embodiment. The projector 1 includes a integrator illumination system 41, a color separation system 42, a relay system 43, an electric optical device 44 including a light modulating optical device and a color combining system integrated with respect to each other, and a projection lens 3.

The integrator illumination system 41 is an optical system for uniformizing the illumination intensity of luminous flux emitted from a light source in a plane orthogonal to the optical axis of the illumination, and includes a light source 411, a first lens array 412, a second lens array 413, a polarization conversion element 414, and a superimposing lens 415.

The light source 411 includes a light source lamp 416 as an radiating light source and a reflector 417, in which radial light beams emitted from the light source lamp 416 are reflected on the reflector 417 into substantially parallel light beams, and are emitted toward the outside. Although a high pressure mercury lamp is employed as the light source lamp 416 in this example, a metal halide lamp or a halogen lamp may be employed as alternatives. Although a parabolic mirror is used as the reflector 417 in this example, it is also possible to employ a structure in which a parallelizing concave lens is disposed on a light-exiting surface of the reflector, which is an ellipsoidal mirror.

The first lens array 412 includes small lenses each having a contour of a substantially rectangular shape when viewed in the direction of the optical axis of illumination arranged into a matrix manner. Each small lens splits luminous flux emitted from the light source lamp 416, and emits the same in the direction of the optical axis of illumination. The contour of each small lens is defined to have a shape substantially similar to the shape of the image forming area on a liquid crystal panel 441, described in greater detail below.

The second lens array 413 has substantially the same structure as the first lens array 412, and has a structure in which small lenses are disposed in a matrix manner. The second lens array 413 has a function to form images of the respective small lenses of the first lens array 412 on the liquid crystal panel 441 together with the superimposing lens 415.

The polarization conversion element 414 converts light from the second lens array 413 into light of one polarization, whereby coefficient of use of light in the electric optical device 44 is improved.

More specifically, the respective partial luminous fluxes converted into the light of the aforementioned one polarization by the polarization conversion element 414 can be substantially superimposed finally on the liquid crystal panel 441 of the electric optical device 44 by the superimposing lens 415. With the projector having the liquid crystal panel 441 of a type which modulates the polarized light, only light of one polarization can be used. Therefore, substantially a half the luminous flux from the light source lamp 416, which emits random polarized light, cannot be used. Therefore, by using the polarization conversion element 414, the luminous flux emitted from the light source lamp 416 can be converted into light of substantially one polarization to improve coefficient of use of light in the electric optical device 44. Such a polarization conversion element 414 is introduced in, for example, JP-A-8-304739.

The color separation system 42 can include two dichroic mirrors 421, 422, and a reflection mirror 423, and has a function to separate a plurality of partial luminous fluxes emitted from the integrator illumination system 41 into three colored lights of red (R), green (G), and blue (B) by the dichroic mirrors 421, 422.

The relay system 43 includes a light incident-side lens 431, a relay lens 433, and reflecting mirrors 432, 434, and has a function to guide the red light which is the colored light separated by the light separation system 42 to a liquid crystal panel 441R.

In this case, the dichroic mirror 421 of the light separation system 42 transmits red light component and green light component in the luminous flux emitted from the integrator illumination system 41, and reflects blue light component thereof. The blue light reflected by the dichroic mirror 421 is reflected by the reflection mirror 423, passes through a field lens 418, and reaches a liquid crystal panel 441B for blue color. The field lens 418 converts the respective partial light fluxes emitted from the second lens array 413 into luminous fluxes parallel to the center axis (main beam) thereof. The field lenses 418 provided on the light incident-sides of other liquid crystal panels 441G, 441R work in the same manner.

Out of the red light and the green light which are transmitted through the dichroic mirror 421, the green light is reflected by the dichroic mirror 422, passes through the field lens 418, and reaches the liquid crystal panel 441G for green color. On the other hand, the red light is transmitted through the dichroic mirror 422, passes through the relay system 43, and then through the field lens 418, and reaches the liquid crystal panel 441R for red light.

The reason why the relay system 43 is used for red light is the length of an optical path of red light is longer than those of lights of other colors, and hence it is necessary to prevent deterioration of coefficient of use of light due to divergence of light or the like. In other words, it is for transmitting the partial luminous flux incoming into the light incident-side lens 431 to the field lens 418 as is. Although the relay system 43 is configured to transmit red light out of lights in three colors, it is not limited thereto, and may be configured to transmit blue light, for example.

The electric optical device 44 forms color images by modulating the incoming luminous flux according to image information, and includes three light incident-side polarizers 442 which the lights in the respective colors separated by the light separation system 42 come in, liquid crystal panels 441 (441R, 441G, 441B) as light modulation elements to be disposed on the downstream side of the respective light incident-side polarizers 442, light exiting-side polarizers 443 to be disposed on the downstream side of the respective liquid crystal panels 441R, 441G, 441B, and a cross-dichroic prism 444 as a light combining system.

Figure 2:
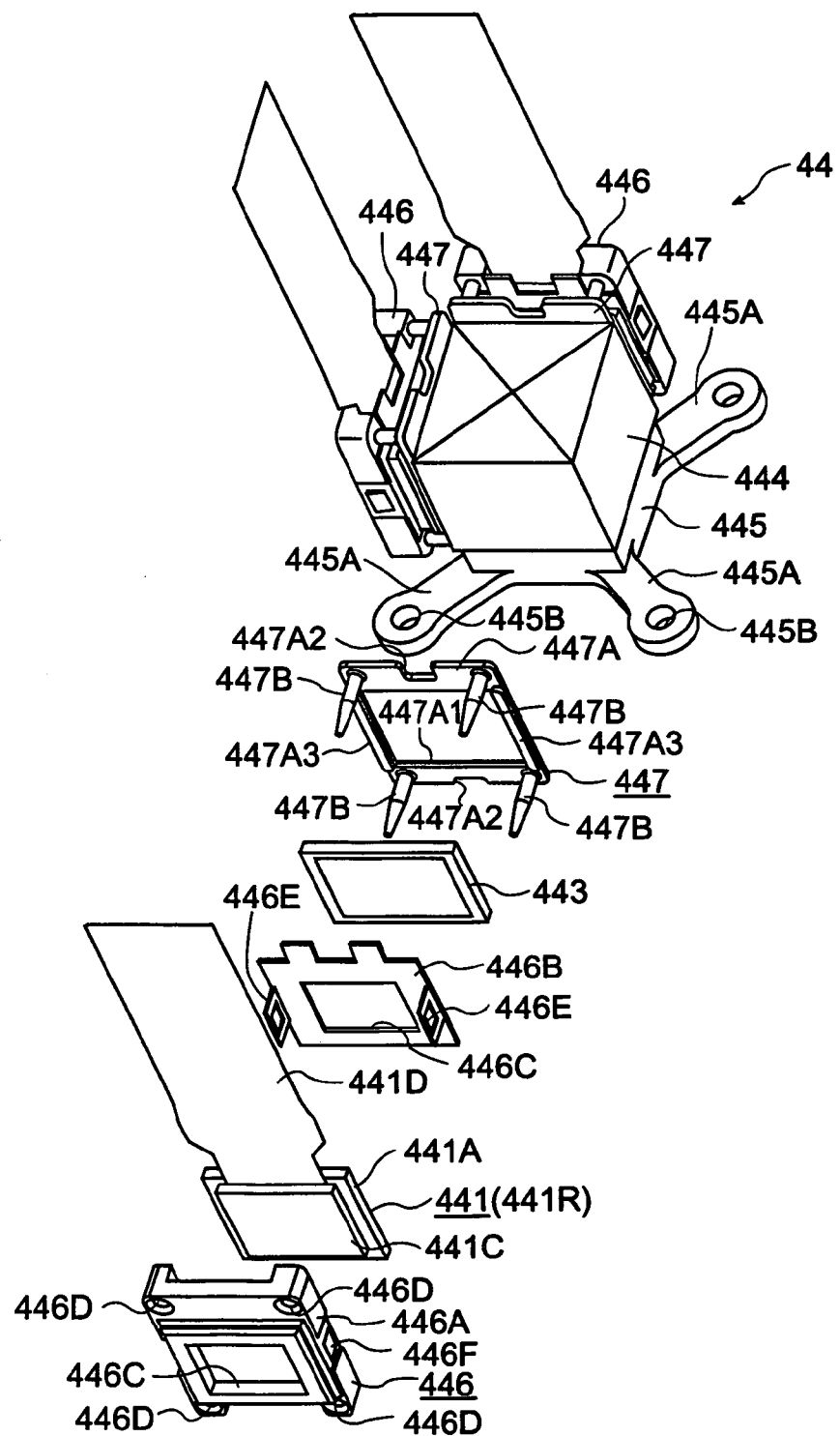
FIG. 2 is an exploded perspective view showing an electric optical device of the projector.

The liquid crystal panels 441R, 441G, 441B are, as shown in FIG. 2 as well, formed by encapsulating liquid crystal between a drive substrate 441A (for example, a substrate on which a plurality of linear electrodes, electrodes constituting pixels, and TFT elements electrically connected between them) and an opposed substrate 441C (for example, a substrate on which the common electrodes are formed). Then, a control cable 441D is extending from between these substrates 441A and 441C. A structure in which a dust-proof plate for optically putting dusts attached on the surface of the panel in the shade by displacing the position of the panel surface of the liquid crystal panel 441 from the back focus position of the projection lens 3 is secured on the substrate 441A or 441C.

The lights of the respective colors separated by the light separation system 42 can be modulated at these three liquid crystal panels 441R, 441G, 441B, the light incident-side polarizer 442, and the light exiting-side polarizer 443 according to image information and form an optical image.

The light incident-side polarizer 442 allows only light polarized in a certain direction to pass out of the lights of the respective colors separated by the light separating system 42 and absorbs remaining portion of the luminous flux, and is formed by adhering a polarizing film on a substrate, such as a sapphire glass. It is also possible to adhere the polarizing film on the field lens 418 without using the substrate.

The light exiting-side polarizer 443 is configured in the substantially same manner as the light incident-side polarizer 442, and allows only light polarized in certain direction to pass out of the luminous flux emitted from the liquid crystal panels 441 (441R, 441G, 441B), and absorbs remaining portion of the luminous flux. It is also possible to adhere the polarizing film on the cross-dichroic prism 444 without using the substrate.

The light incident-side polarizer 442 and the light exiting-side polarizer 443 are oriented so that the directions of axes of polarization thereof are orthogonal to each other.

The cross-dichroic prism 444 combines the optical images emitted from the light exiting-side polarizers 443 and modulated for each colored light to form a color image. The cross-dichroic prism 444 can include a dielectric multi-layer film which reflects red light and a dielectric multi-layer film which reflects blue light oriented so as to form a substantially X-shape along the boundary faces of four right-angle prisms, whereby three colored lights are combined by these dielectric multi-layer films.

The above-described electric optical device 44 can include a base member 445, a retaining frame 446, and a panel fixing plate 447 as a retaining member, as shown in FIG. 2, in addition to the above-described liquid crystal panel 441, the incident-side polarizer 442, and the light exiting-side polarizer 443, and the cross-dichroic prism 444. The retaining frame 446 accommodates the liquid crystal panel 441, and is integrally fixed to the end surface on the luminous flux incident-side of the cross-dichroic prism 444 via the panel fixing plate 447. The light incident-side polarizer 442 is fixed to an enclosure for optical components 2, described below.

The four right-angle prisms of the cross-dichroic prism 444 are formed of optical glass. In addition to the optical glass, the cross-dichroic prism 444 may be formed of sapphire, crystal, and the like.

Figure 3:
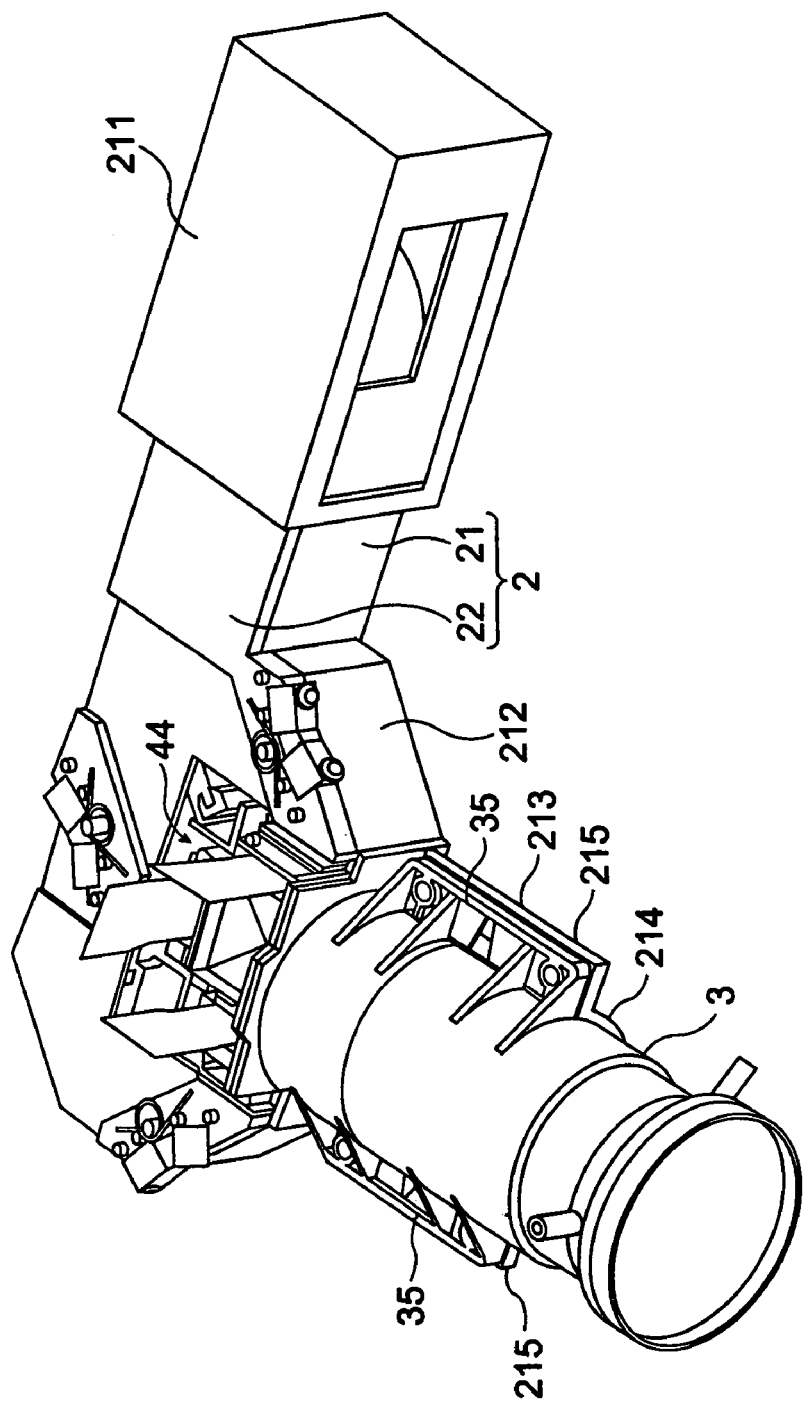
FIG. 3 is a perspective view showing an enclosure for optical components.

The base member 445 is fixed to the lower surface of the cross-dichroic prism 444, and fixes the integrated electric optical device 44 to a lower light guide 21 (see FIG. 3). The base member 445 is a plate material formed substantially in a rectangular shape, and is provided with extending portions 445A which extend from four corners thereof. The extending portions 445A are formed with holes 445B respectively at the distal ends thereof, so that the electric optical device 44 is fixed to the lower light guide 21 by engaging holes formed on the bottom surface of the lower light guide 21, not shown, and the above-described holes 445B with screws or the like. The rectangular portion of the base member 445 is formed to be slightly smaller than the outer peripheral shape of the cross-dichroic prism 444. Therefore, the base member 445 and the panel fixing plate 447 do not interfere to each other when the panel fixing plate 447 is fixed to the side surface of the cross-dichroic prism 444.

The retaining frame 446 accommodates the liquid crystal panel 441. The retaining frame 446 includes a recessed frame 446A having a storing portion for storing the liquid crystal panel 441, and a supporting plate 446B which engages the recessed frame 446A and presses and fixes the liquid crystal panel 441 stored therein. The retaining frame 446 is provided with an opening 446C at a position corresponding to the panel surface of the stored liquid crystal panel 441. Furthermore, the retaining frame 446 is formed with holes 446D at four corners thereof. Fixation of the recessed frame 446A and the supporting plate 446B are achieved by engagement between hooks 446E provided on left and right ends of the supporting plate 446B and hook engaging portions 446F provided on the recessed frame 446A at positions corresponding thereto.

The liquid crystal panel 441, here, is exposed at the opening 446C of the retaining frame 446, and this portion corresponds to an image forming area. In other words, respective colored lights R, G, B are guided into this portion of the liquid crystal panel 441, and an optical image is formed according to image information.

Furthermore, the end surface of the supporting plate 446B on the light exiting side is provided with a light-shielding film (not shown), which prevents light reflected from the cross-dichroic prism 444 from being further reflected toward the cross-dichroic prism 444 so that lowering of contrast by stray light is prevented.

The panel fixing plate 447 retains and fixes the retaining frame 446 for storing the liquid crystal panel 441. The panel fixing plate 447 includes a rectangular plate member 447A, and pins 447B projecting from four corners of the rectangular plate member 447A. The positions of the pins 447B are not necessarily required to be the corners of the rectangular plate member 447A. Also, the number of the pins 447B is not limited to four, and is acceptable as long as there are at least two. In other words, they may be formed so as to correspond to the holes 446D of the retaining frame 446 according to the design.

The panel fixing plate 447 is interposed between the retaining frame 446 and the cross-dichroic prism 444. The panel fixing plate 447 and the cross-dichroic prism 444 are fixed to each other by adhering the end surface of the panel fixing plate 447 on the opposite side from the pins 447B to the end surface of the cross-dichroic prism 444 on the light incident-side. The panel fixing plate 447 and the retaining frame 446 are adhered and fixed to each other via the pins 447B of the panel fixing plate 447 and the holes 446D of the retaining frame 446.

The rectangular plate member 447A is formed with a substantially rectangular opening 447A1 corresponding to the image forming area of the liquid crystal panel 441. The rectangular plate member 447A is formed with notches 447A2 for absorbing hot behavioral difference from the outer peripheral edge toward the opening 447A1 so as to be orthogonal to the upper and lower side edges. Furthermore, the rectangular plate member 447A is formed with supporting surfaces 447A3 along the left and right side edges so that the light exiting-side polarizer 443 can be mounted.

The pin 447B has a substantially conical shape which is tapered from the proximate side toward the distal end. The pin 447B has a diameter larger than the hole 446D formed on the retaining frame 446 at the proximal portion extending from the rectangular plate member 447A so that a space is secured between the liquid crystal panel 441 and the panel fixing plate 447 when the liquid crystal panel 441 is mounted.

The electric optical device 44 described above is manufactured in a following manner.

(a) First, the base member 445 is fixed to the lower surface of the cross-dichroic prism 444 with adhesive agent.

(b) Then, the light exiting-side polarizer 443 is fixed to the supporting surface 447A3 of the panel fixing plate 447 with double-sided adhesive tape or adhesive agent.

(c) The respective liquid crystal panels 441R, 441G, 441B are stored in the recessed frame 446A of the retaining frame 446. Subsequently, the supporting plate 446B of the retaining frame 446 is mounted from the liquid crystal panel inserting side of the recessed frame 446A, so that the respective liquid crystal panels 441R, 441G, 441B are retained by being pressed and fixed.

(d) The pins 447B of the panel fixing plate 447, on which photo-curing adhesive agent is applied, are inserted into the holes 446D of the retaining frame 446, in which the respective liquid crystal panels 441R, 441G, 441B are stored.

(e) The end surface of the panel fixing plate 447 on the opposite side from the pins 447B is tightly adhered to the end surface of the cross-dichroic prism 444 on the light incident-side via adhesive agent. In this case, the panel fixing plate 447 is tightly adhered to the side surface of the cross-dichroic prism 444 by a surface tension of the adhesive agent.

(f) Luminous flux can be guided to the image forming area of the liquid crystal panel 441 in a state in which the photo-curing adhesive agent is not cured yet. The guided luminous flux is emitted from the master lens as a standard projection system and projected on the screen. Then, the position of the liquid crystal panel 441 with respect to the light incident-end surface of the cross-dichroic prism 444 in the fore-and-aft direction, the on a plane, and in the rotational direction is adjusted to adjust focus alignment of the liquid crystal panel 441. Then, the adhesive agent is allowed to cure completely, whereby the electric optical device 44 is completed.

The optical components constituting the integrator illumination system 41, the color separation system 42, the relay system 43, and the electric optical device 44 of the optical system 4 described above are stored in the enclosure for optical component (base member) 2 as shown in FIG. 3.

The enclosure for optical components 2 includes the lower light guide 21 formed into the shape of a box opening on top, and an upper light guide 22 formed into a lid shape for covering the opening of the lower light guide 21.

The lower light guide 21 has a substantially L-shape in plan view, and includes a first storage section 211 for storing the light source 411, and a second storage section 212 for storing other optical components 412–415, 418, 421–423, 431–434, 44. The second storage section 212 is formed with a groove (not shown) for fitting the optical components 412–415, 418, 421–423, 431–434 in a sliding manner.

The second storage section 212 of the lower light guide 21 is formed with a projection lens installing section 213 for mounting and fixing the projection lens 3. The projection lens installing section 213 is formed on the light exiting-side of the second storage section 212 at the portion where the electric optical device 44 is to be installed.

The projection lens installing section 213 can include a curved portion 214 curved into a substantially arcuate shape, and a pair of plate-shaped supporting portions 215 extending horizontally from the ends of the curved portion 214 outwardly. The supporting portions 215 have a rectangular shape in plan view, and support flanges 35 of the projection lens 3, described below, from below. Each supporting portion 215 is formed with a pair of threaded holes 216 (see FIG. 5) at both ends thereof in the longitudinal direction. Ends of screwing shafts S11 of fixing screws (screwing members) S1 threaded on the outer peripheral surface thereof are screwed into the holes 216.

Figure 4:
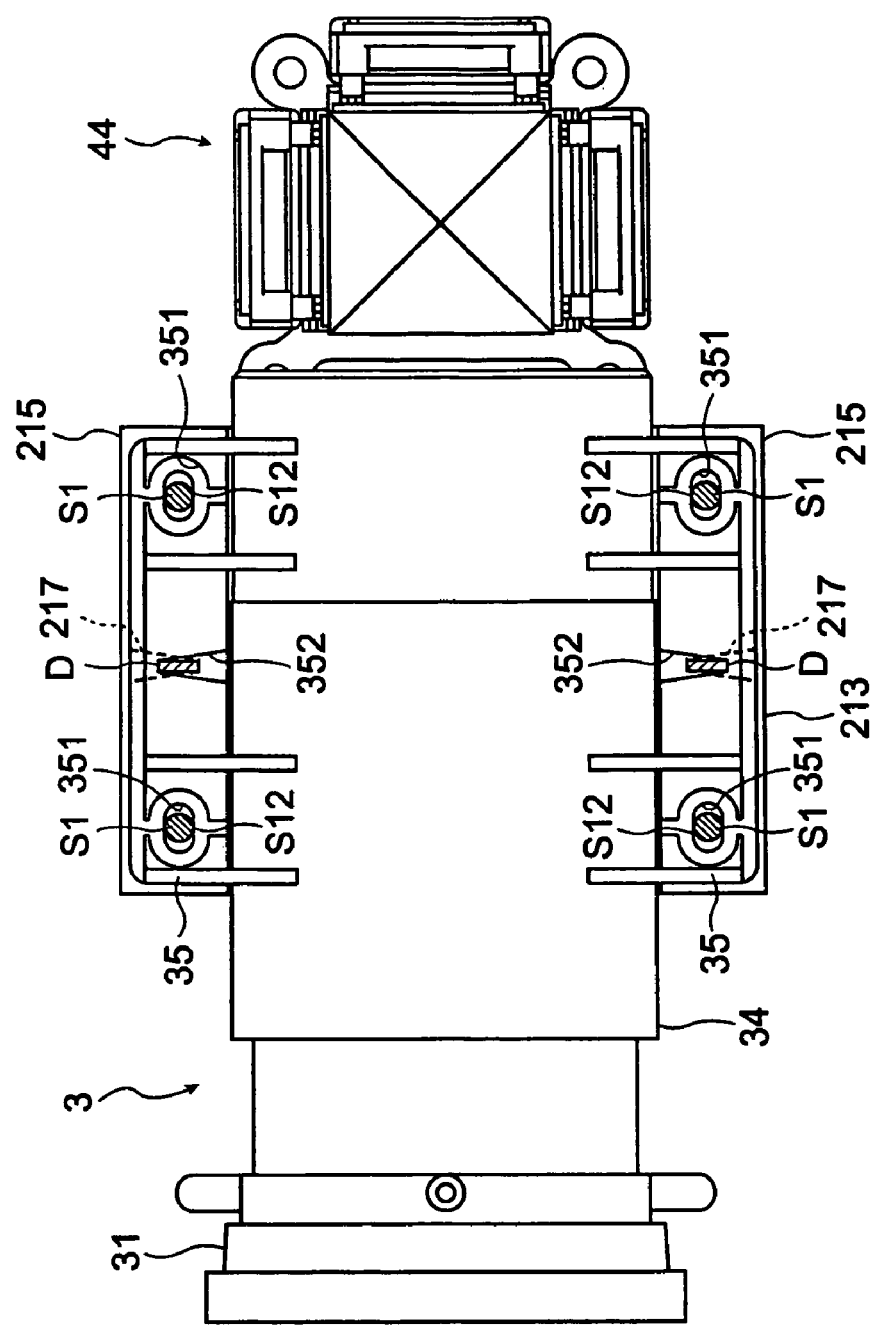
FIG. 4 is a plan view showing a principal portion of the enclosure for optical components and a projection lens.
Figure 5:
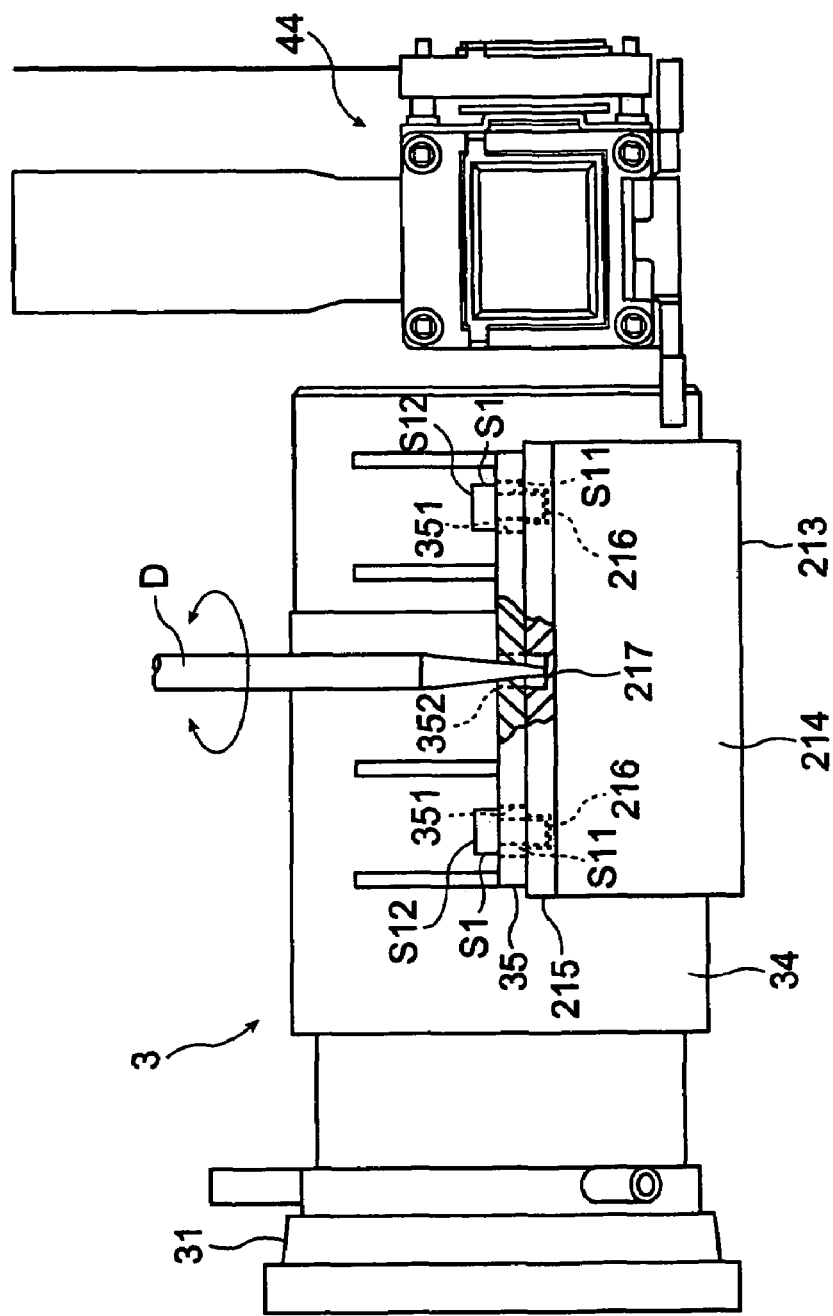
FIG. 5 is a side view showing the principal portion of the enclosure for optical components and the projection lens.

Each supporting portion 215 is formed with a groove 217 substantially at the longitudinal center thereof as shown in FIG. 4 and FIG. 5. The groove 217 has a substantially trapezoidal shape in plan view when viewed from the side of the front surface of the flange 35 of the projection lens 3, described later (from the upper side of the projection lens installing section 213), and hence is reduced in width toward the direction opposite from the extending direction of the supporting portion 215, that is, toward the curved portion 214.

Referring now to FIG. 3 to FIG. 5, the structure of the projection lens 3 will be described. In FIG. 4 and FIG. 5, only the projection lens installing section 213 of the enclosure for optical components 2 is shown.

The projection lens 3 can include a lens barrel 31 formed of resin or the like and having a predetermined optical path set therein and a plurality of lenses (not shown) disposed on the illumination axis of the optical path in the lens barrel 31 in sequence. The lens barrel 31 includes a cylindrical portion 34 and a pair of flanges 35 extending horizontally outward from the cylindrical portion 34 in the direction orthogonal to the direction of the optical axis of the lens. When the projection lens 3 is installed on the projection lens installing section 213, the cylindrical portion 34 is placed on the curved portion 214 of the projection lens installing section 213. Each of the flange 35 has a substantially rectangular shape in plan view when viewed from above the projection lens 3, and are formed with a pair of elongated holes 351 extending along the longitudinal direction (that is, in the direction of the optical axis of the projection lens 3). The fixing screws S1 are inserted into the elongated holes 351.

The length (diameter) of the longer side of the elongated hole 351 is larger than the diameter of the screwing shaft S11 of the fixing screw S1. The length of the shorter side of the elongated hole 351 is smaller than the diameter of the head S12 of the fixing screw S1 which corresponds to the other end of the fixing screw S1, so that the head S12 of the fixing screw S1 is engaged with the elongated hole 351.

The center of the flange 35 is formed with a notch (pierced portion) 352. The notch 352 penetrates from the front surface to the back surface (from the surface opposing to the supporting portion 215 to the surface opposite therefrom). The notch 352 has a trapezoidal shape in plan view when viewed from the front surface side of the flange 35 (from above the projection lens 3), and is reduced in width outwardly of the flange 35, that is, in the extending direction of the flange 35.

When the flanges 35, as described above, are installed on the supporting portions 215, the notches 352 of the flanges 35 and the grooves 217 of the supporting portions 215 are overlapped and communicated with each other. A space defined by the notch 352 and the groove 217 is such that, when viewed from the front surface side of the flange 35, the width is smallest at the end in the extending direction of the flange 35 and at the end in the opposite direction therefrom, and increases gradually toward the intersection between the peripheral edge of the notch 352 and the peripheral edge of the groove 217.

In the exemplary embodiment, the notch 352 of the flange 35 is reduced in width toward the extending direction of the flange 35 and the groove 217 is reduced in width toward the direction opposite from the extending direction of the supporting portion 215. However, it should be understood that it is not limited thereto, and a structure in which the notch is reduced in width toward the direction opposite from the extending direction of the flange 35 and the groove is reduced in width toward the extending direction of the supporting portion 215 may also be employed.

Next is described an exemplary method of Performing Postural Adjustment of Projection Lens 3 and Fixing The Same to Enclosure for Optical Components 2 the projection lens 3, as described above, is fixed to the enclosure for optical components 2 in the manner shown below. When fixing the projection lens 3 to the enclosure for optical components 2, the optical components such as the electric optical device 44, the integrator illumination system 41, the color separation system 42, and the relay system 43 are already stored in the enclosure for optical components 2.

First, the projection lens 3 is installed on the projection lens installing section 213 of the enclosure for optical components 2. More specifically, the cylindrical portion 34 of the projection lens 3 is installed on the curved portion 214 of the projection lens installing section 213, and simultaneously, the flanges 35 are installed on the supporting portions 215.

Figure 6:
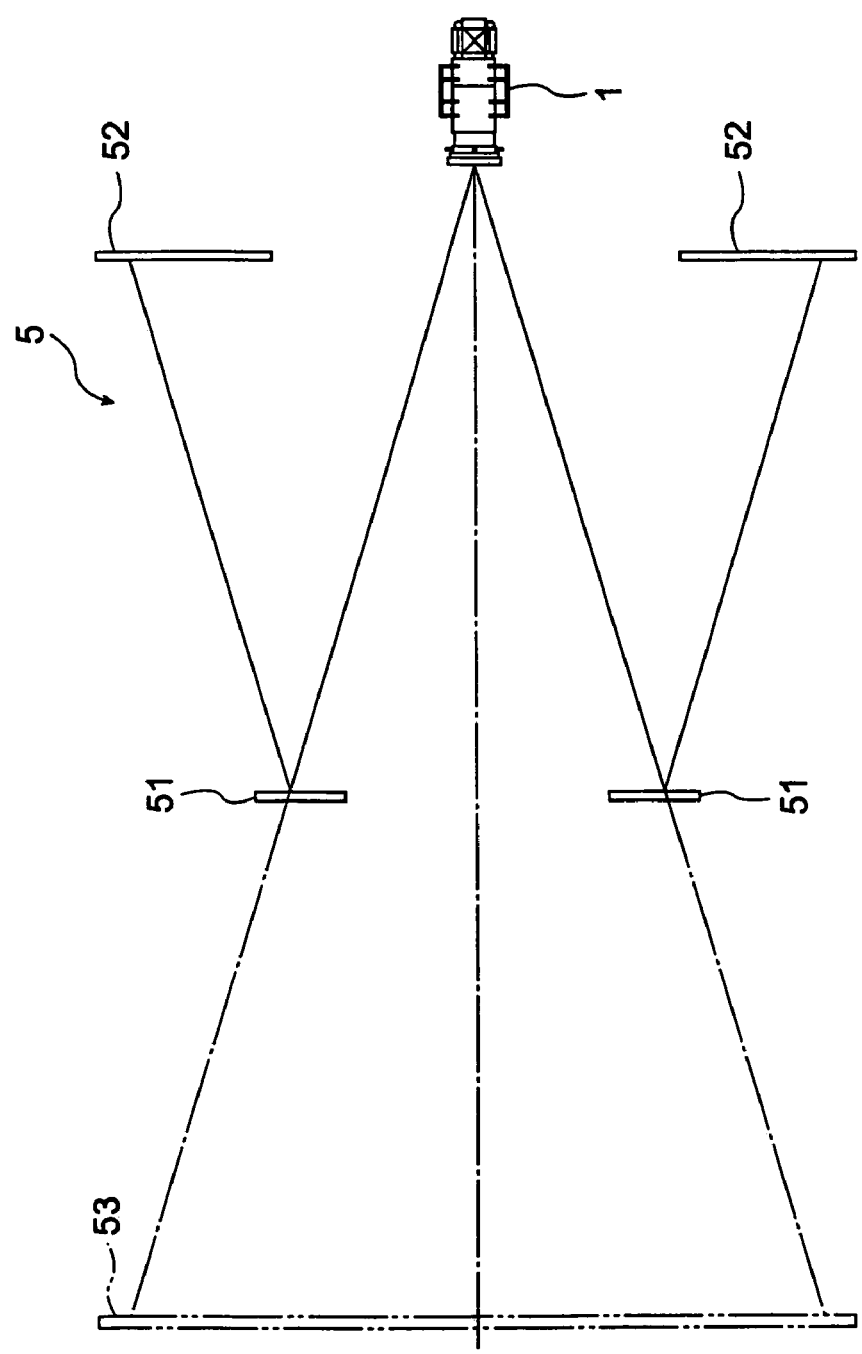
FIG. 6 is a plan view showing a device for projecting a projecting image of the projector.
Figure 7:
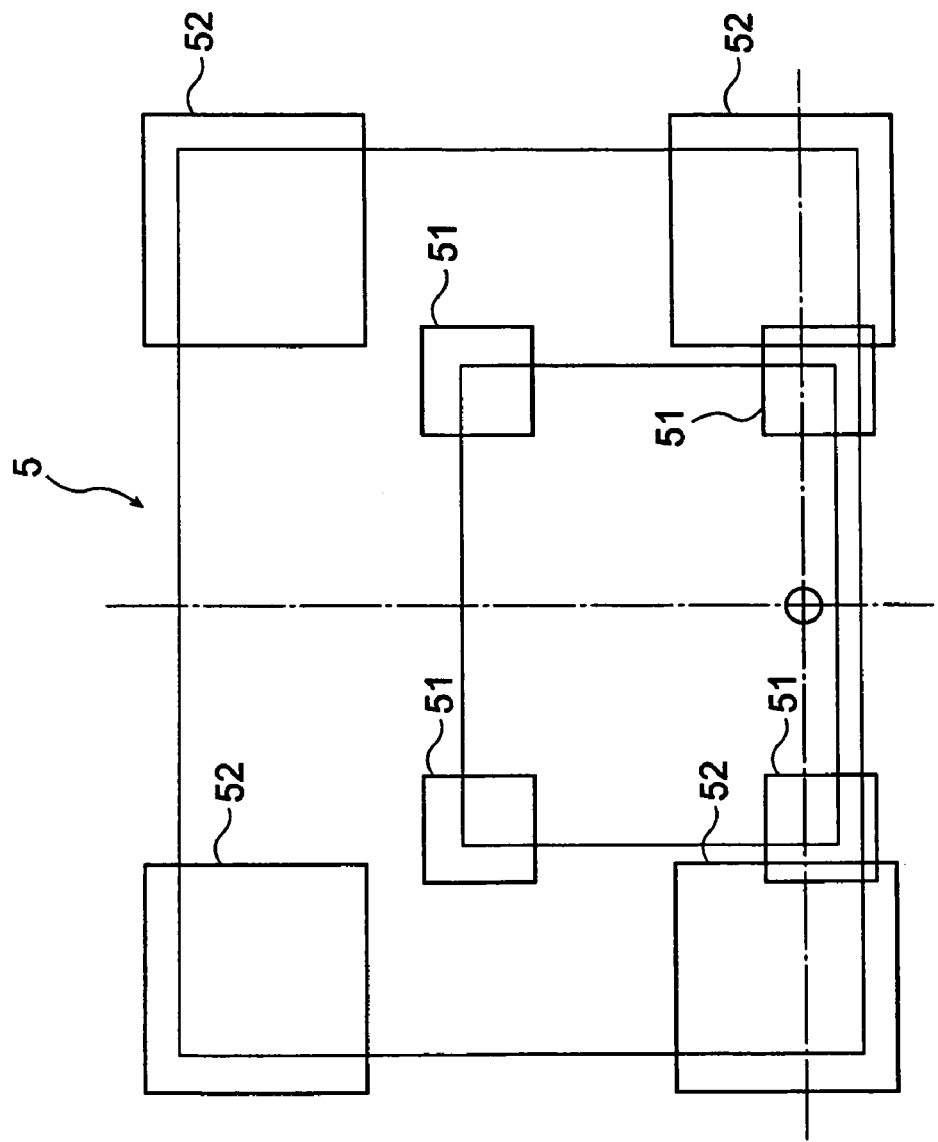
FIG. 7 is a plan view showing the device.

Then, the fixing screws S1 are inserted into the elongated holes 351 of the flanges 35 and the screw holes 216 of the supporting portions 215. In this case, the heads S12 of the fixing screws S1 are kept out of engagement with the elongated holes 351 of the flange 35. Subsequently, the electric optical device 44 is driven to display luminous flux emitted from the electric optical device 44 on a screen via the projection lens 3. In this case, a device 5 as shown in FIG. 6 and FIG. 7 is used. FIG. 6 is a plan view of the device 5 when viewed from above, and FIG. 7 is a drawing of the device 5 when viewed from the front (from the side of the projector 1).

The device 5 can be provided with four reflection mirrors 51 and four rear screens 52. The four reflection mirrors 51 are installed at about half a distance to the position of a screen 53 used in the related art (shown by a chain double-dashed line in FIG. 6) on which a projection image from the projector 1 is displayed, and are installed at positions corresponding to four corners of the projection image from the projector 1.

The rear screens 52 are disposed in the vicinity of the projector 1 for projecting the projection image reflected by the reflection mirrors 51.

The postural adjustment (positional adjustment) of the projection lens 3 is performed while observing the projection image of the predetermined test pattern projected on the rear screens 52, as described above.

More specifically, a rod-shaped adjusting member, for example, a flat-head screwdriver D, is inserted into the space defined by the notch 352 of the flange 35 of the projection lens 3 and the groove 217 of the supporting portion 215, which are overlapped with each other as shown in FIGS. 4 and 5. In this case, the longitudinal direction of the end surface of the tip of the flat-head screwdriver D is oriented so as to extend along the extending direction of the supporting portion 215 and the flange 35.

Figure 8:
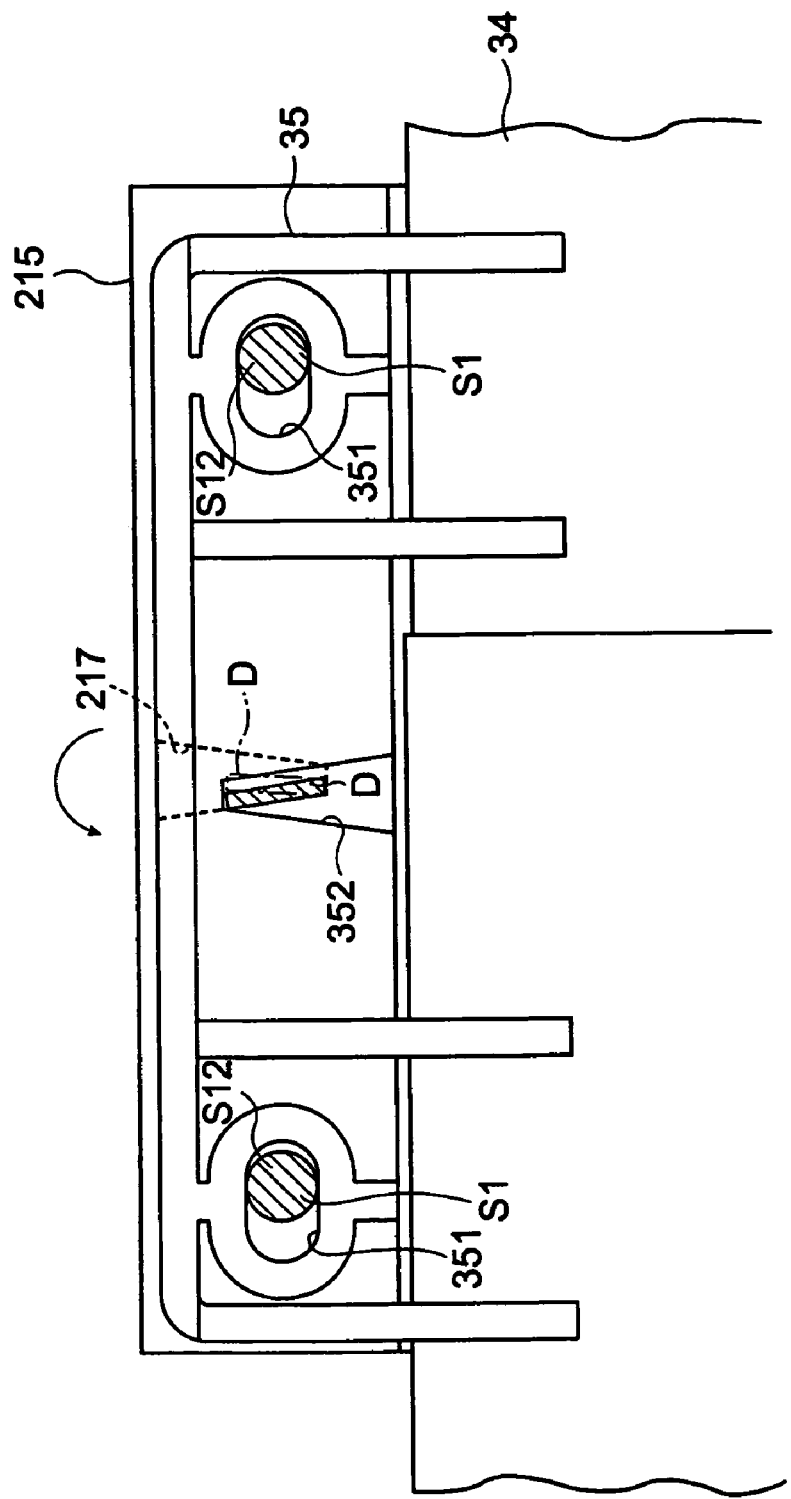
FIG. 8 is an enlarged view showing the projection lens and the principal portion of the enclosure for optical components.

Then, the flat-head screwdriver D is turned while observing the image projected on the rear screen 52. For example, when the flat-head screwdriver D is turned in the direction indicated by an arrow in FIG. 8, the tip of the flat-head screwdriver D comes into abutment with the peripheral edge of the notch 352 of the flange 35 of the projection lens 3 and the peripheral edge of the groove 217 of the supporting portion 215. Accordingly, a force is exerted to the peripheral edge of the notch 352 of the flange 35 of the projection lens 3, and hence the flange 35 of the projection lens 3 moves on the supporting portion 215. Since the projection lens 3 moves along the direction of the optical axis, positional adjustment of the back focus position of the projection lens 3 is achieved.

When performing positional adjustment, the screwing shaft S11 of the fixing screw S1 slides in the elongated hole 351 of the flange 35 of the projection lens 3 in accordance with the movement of the projection lens 3.

Then, when the projection lens 3 is installed at the predetermined position, the fixing screws S1 are screwed into the screw holes 216 completely, so that the heads S12 of the fixing screws S1 are brought into engagement with the elongated holes 351, whereby the projection lens 3 is fixed.

It is also possible to fix the flange 35 on one side to the supporting portion 215 on one side by the fixing screws S1 and insert the screwdriver D into the notch 352 of the flange 35 and the groove 217 of the supporting portion 215 on the other side and turn the screwdriver D. With this operation, the projection lens 3 can be moved laterally when viewed from the front (front of the projector 1), whereby the postural adjustment can be also achieved.

The projection lens 3 and the enclosure for optical components 2 are fixed to each other in the manner described above.

After the postural adjustment of the projection lens 3 is completed, the postural adjustment of the superimposing lens 415 or the like is performed for eliminating display shadow of the projection image.

Consequently, according to the first exemplary embodiment, the following effects are achieved. As described above, the flanges 35 of the projection lens 3 are formed with the notches 352 which are penetrated from the front surface to the back surface thereof, and the supporting portion 215 of the enclosure for optical components 2 is formed with grooves 217 which communicate with the notches 352. Based on the projection image from the projection lens 3, the flange 35 is slid on the supporting portion 215 by inserting the flat-head screwdriver D into the notch 352 and the groove 217, and bringing the flat-head screwdriver D into abutment with the peripheral edge of the notch 352, so that the postural adjustment of the projection lens 3 can be achieved. Then, after the postural adjustment is completed, the projection lens 3 is fixed to the enclosure for optical components 2 by the fixing screw S1.

As described above, in the exemplary embodiment, since the projection lens 3 is fixed to the enclosure for optical components 2 after the postural adjustment of the projection lens 3 is completed based on the projection image, the projection lens 3 can be fixed to the position where the optimal projection image is obtained, and hence the quality of the image can be improved.

Also, since the projection lens 3 can be fixed to the position where the optimal projection image can be obtained by performing the postural adjustment of the projection lens 3, the improvement of the quality of the image is ensured even when the electric optical device 44 which is mass-produced via the master lens system is used. Accordingly, substantially the same images as those obtained with the electric optical devices manufactured corresponding to the respective projection lenses to be mounted on the projector can be produced. As described above, since the electric optical device 44 which is mass-produced via the master lens system can be used and the quality of the image can be improved, reduction of the manufacturing cost of the projector 1 and improvement of the quality of the image can be achieved simultaneously.

Also, in the present embodiment, since the projection lens 3 can be slid on the enclosure for optical components 2 along the direction of the optical axis, and the projection lens 3 can be moved laterally when viewed from the front (front of the projector 1), the position of the projection lens 3 can be adjusted adequately so that the liquid crystal panel 441 of the electric optical device 44 is positioned at the back focus position of the projection lens 3.

Furthermore, since the postural adjustment of the projection lens 3 is performed but the positional adjustment is not performed on the side of the electric optical device 44, deterioration of the accuracy of the optical axis due to displacement of the electric optical device 44 can be prevented.

Also, as described above, since the notches 352 is reduced in width toward the extending direction of the flange 35 and the groove 217 is reduced in width toward the direction opposite from the extending direction of the supporting portion 215, a space defined by the notch 352 and the groove 217 is smallest in width at the end in the extending direction of the flange 35 and the end on the opposite side from the extending direction, and increases gradually toward the intersection between the peripheral edge of the notch 352 and the peripheral edge of the groove 217 when viewed from the surface side of the flange 35.

By inserting the tip of the flat-head screwdriver D into a space defined by the notch 352 and the groove 217 as described above and turning the flat-head screwdriver D, the flat-head screwdriver D comes into abutment with the peripheral edge of the notch 352 and the peripheral edge of the groove 217. Accordingly, the flange 35 of the projection lens 3 slides on the supporting portion 215, whereby the postural adjustment is achieved.

In this manner, according to the exemplary embodiment, since the postural adjustment is achieved by turning the flat-head driver D, the postural adjustment can be achieved easily.

Since the supporting portion 215 of the enclosure for optical components 2 is formed with the groove 217, and hence the flat-head screwdriver D is also inserted into the groove 217 of the supporting portion 215 when performing the positional adjustment of the flange 35, the movement of the flat-head screwdriver D is constrained and hence excessive movement of the flat-head screwdriver D is prevented. Accordingly, fine adjustment of the projection lens 3 can be achieved.

Furthermore, since the positional adjustment of the projection lens 3 can be achieved by the use of the flat-head screwdriver D as described above, and a jig specific for the positional adjustment is not necessary, reduction of the manufacturing cost of the projector 1 can be achieved.

Since the postural adjustment of the projection lens 3 can be achieved only by forming the notches 352 on the flanges 35 of the projection lens 3, forming the grooves 217 on the supporting portions 215, and forming the elongated holes 351, in which the screwing shafts S11 of the fixing screws S1 can be slid, on the flanges 35, increase in number of members can be prevented.

Moreover, in the exemplary embodiment, the device 5 is used for the postural adjustment of the projection lens 3. The device 5 has a structure in which luminous flux emitted from the projection lens 3 is reflected by the reflection mirrors 51 and projected on the rear screens 52. In other words, since the reflection mirrors 51 are disposed at about half a distance from the projector 1 to the screen 53 which is disposed in the related art, and the rear screens 52 are disposed in the vicinity of the projector 1, the size of the device 5 can be reduced.

Also, since the rear screens 52 are disposed in the vicinity of the projector 1 at the positions very close to the operator who performs the postural adjustment of the projection lens 3, the operator can visually observe the projection image.

It is also possible to perform the postural adjustment of the projection lens 3 while taking pictures of the projection image from the projector 1 by a camera or the like for detecting the image. However, it may increase the cost for the postural adjustment of the projection lens 3. In contrast, according to the present embodiment, the postural adjustment of the projection lens 3 is performed while visually observing the image projected on the rear screens 52, and hence the camera or the like is not necessary, increase in cost for the postural adjustment of the projection lens 3 can be prevented.

Figure 9:
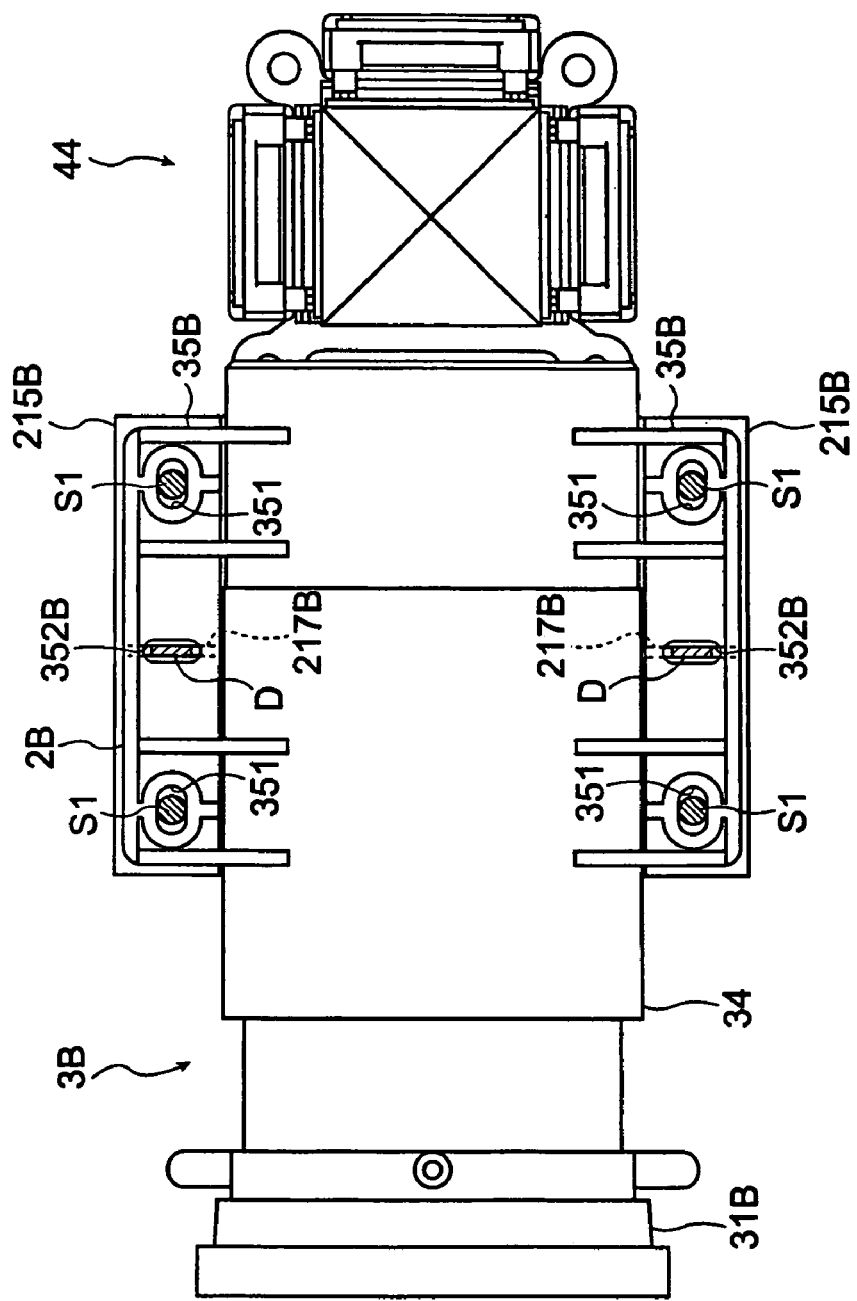
FIG. 9 is a plan view showing the principal portion of the enclosure for optical components and the projection lens according to a second exemplary embodiment of the present invention.
Figure 10:
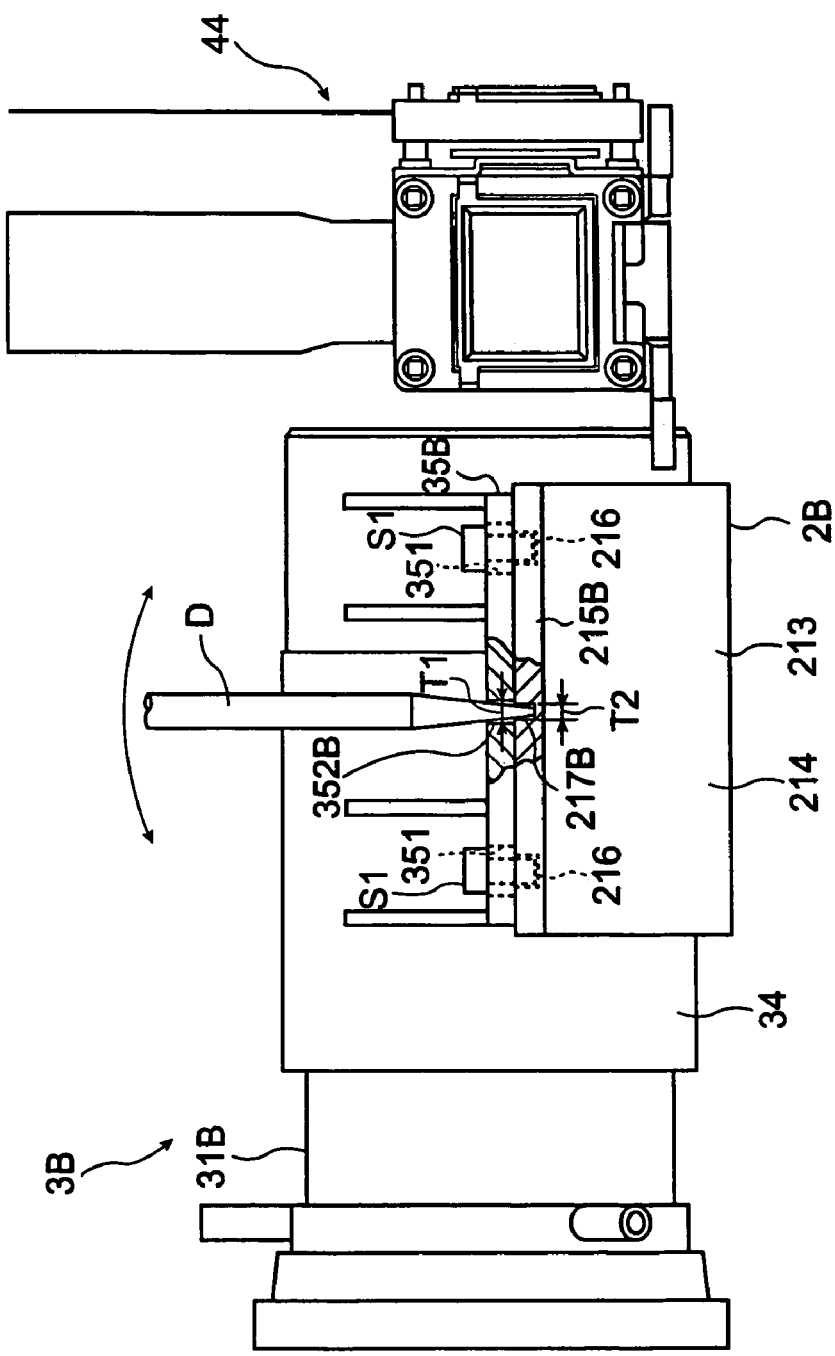
FIG. 10 is a side view showing the principal portion of the enclosure for optical components and the projection lens.
Figure 11:
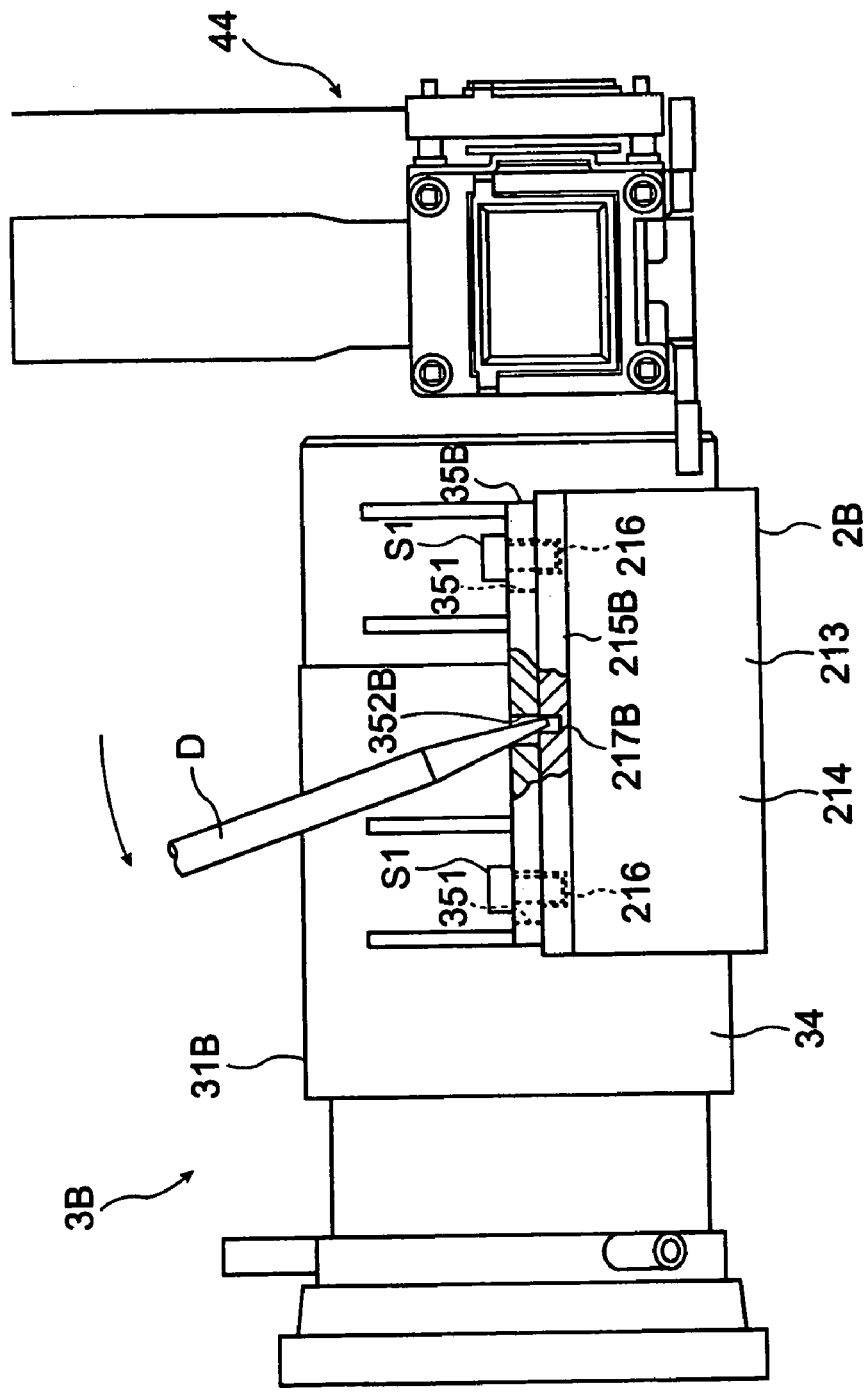
FIG. 11 is a side view showing the principal portion of the enclosure for optical components and the projection lens.

Referring now to FIG. 9 to FIG. 11, a second exemplary embodiment of the invention will be described. In the following description, the same parts as those described above will be designated by the same reference numerals and description thereof will be omitted.

As shown in FIG. 9 and FIG. 10, a projection lens 3B of the present embodiment includes a lens barrel 31B formed of resin or the like and having a predetermined optical path set therein and a plurality of lenses (not shown) to be disposed on the illumination axis of the optical path in the lens barrel 31B in sequence as in the case of the projection lens 3 of the previous embodiment.

The lens barrel 31B includes the cylindrical portion 34 as in the previous embodiment, and a pair of flanges 35B extending horizontally from the cylindrical portion 34. The flange 35 of the projection lens 3 is formed with the notches 352 of a trapezoidal shape in plan view in the previous embodiment, while the flanges 35B of the projection lens 3B of the present embodiment are formed with elongated holes (pierced portions) 352B having an oval shape in plan view and penetrating from the front surface to the back surface. The elongated holes 352B are oriented so that the elongated sides thereof extend along the extending direction of the flanges 35B.

As regards other points, the flanges 35B of the projection lens 3B and the flanges 35 of the projection lens 3 in the previous embodiment have the same structure.

The supporting portions 215 of the enclosure for optical components 2 are formed with the grooves 217 having a substantially trapezoidal shape in plan view in the previous embodiment, while supporting portions 215B of an enclosure for optical components 2B in the present exemplary embodiment is formed with grooves 217B having a rectangular shape in plan view.

The grooves 217B are oriented so that the elongated sides thereof extend along the extending direction of the supporting portion 215B. The width T2 of the groove 217B along the direction of the optical axis of the projection lens 3B (the width orthogonal to the extending direction of the supporting portion 215B and orthogonal to the direction of insertion of the flat-head screwdriver D) is smaller than the width T1 of the elongated hole 352B formed on the flange 35B along the direction of the optical axis of the projection lens 3B, which corresponds to the width of the tip of the flat-head screwdriver D.

As regards other points, the enclosure for optical components 2B has the same structure as the enclosure for optical components 2.

In the embodiment as described above, postural adjustment and fixation of the projection lens 3B are performed in the following manner. First, the flanges 35B of the projection lens 3B are installed on the supporting portions 215B of the enclosure for optical components 2B. At this time, the elongated holes 352B of the flanges 35B and the grooves 217B of the supporting portions 215B are placed so as to be superimposed and communicated with each other.

Subsequently, by the use of the device 5 (see FIG. 6) as in the previous embodiment, a projection image from the projection lens 3B is projected on the rear screens 52. The postural adjustment of the projection lens 3B is performed based on the projection image from the projection lens 3B. More specifically, the tip of the flat-head screwdriver D is inserted into the elongated holes 352B of the flange 35B and the grooves 217B of the supporting portion 215B. Then, as shown in FIG. 11, the flat-head screwdriver D is inclined in the direction substantially along the optical axis of the projection lens 3B (in the direction indicated by an arrow in FIG. 11). Then, the flat-head screwdriver D comes into abutment with the peripheral edge of the elongated hole 352B.

The width T2 of the grooves 217B is smaller than the width T1 of the elongated holes 352B formed on the flanges 35B, so that the tip of the screwdriver D comes into abutment with the peripheral edge of the groove 217B when the flat-head screwdriver D inserted into the groove 217B is inclined. A significant force is exerted on the peripheral edge of the elongated hole 352B with this point of abutment as a fulcrum.

The flange 35B is pressed by the flat-head screwdriver D, and hence slides on the supporting portion 215B. The postural adjustment of the projection lens 3B is achieved in this manner.

Since the method of fixing the projection lens 3B after the postural adjustment is the same as in the previous embodiment, the description thereof is omitted.

According to the second exemplary embodiment described above, the following effects are achieved in addition to the substantially same effects as described above in the previous embodiment.

Since the width T2 of the grooves 217B formed on the supporting portions 215B along the direction of the optical axis of the projection lens 3B is smaller than the width T1 of the elongated holes 352B formed on the flanges 35B, when the flat-head screwdriver D inserted into the groove 217B is inclined, the tip of the screwdriver D comes into abutment with the peripheral edge of the groove 217B. Then, a significant force is exerted to the peripheral edge of the elongated hole 352B of the flange 35B with this abutment point as a fulcrum. Accordingly, the flanges 35B can be slid on the supporting portions 215B easily.

Since the postural adjustment of the projection lens 3B can be performed only by inclining the flat-head screwdriver D as described above, the postural adjustment is facilitated.

Since the postural adjustment of the projection lens 3B can be performed only by inclining the flat-head screwdriver D in the direction of movement of the projection lens 3B, the operator can easily know which direction the flat-head screwdriver D should be moved, and hence the postural adjustment of the projection lens 3B can further be facilitated.

Figure 12:
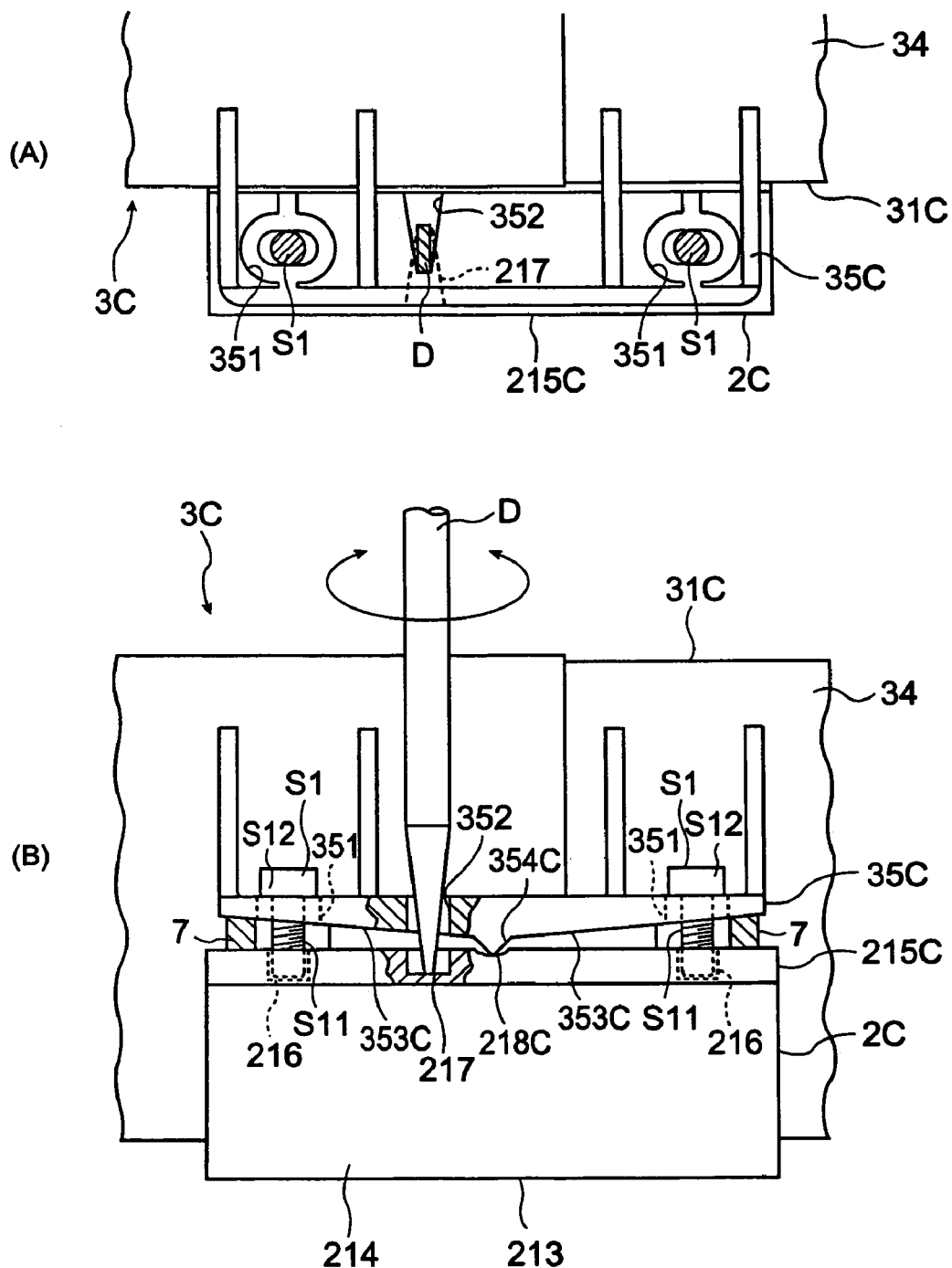
FIG. 12 is a drawing showing the principal portion of the enclosure for optical components and the projection lens according to a third exemplary embodiment of the invention.
Figure 13:
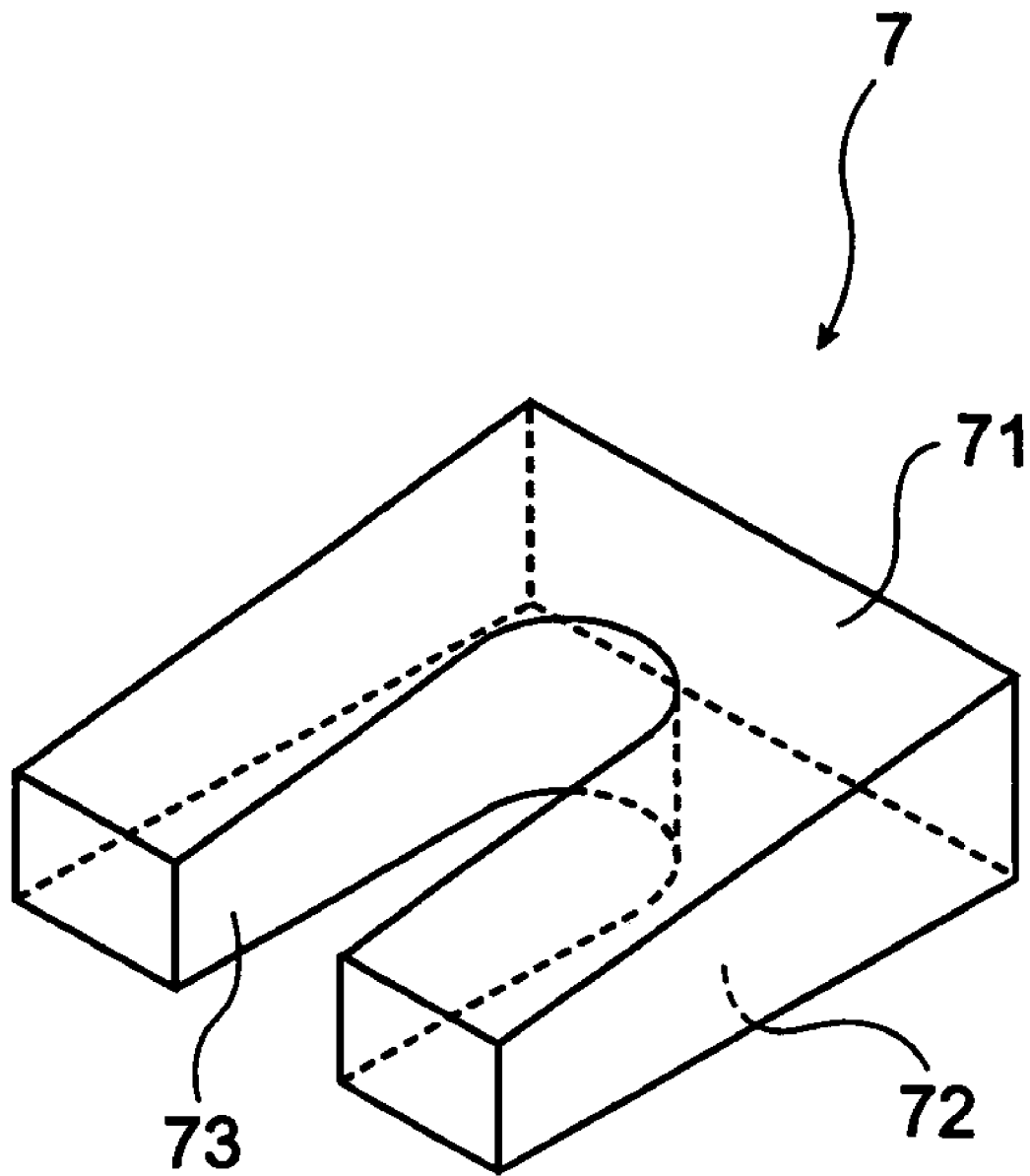
FIG. 13 is a perspective view showing a spacer.
Figure 14:
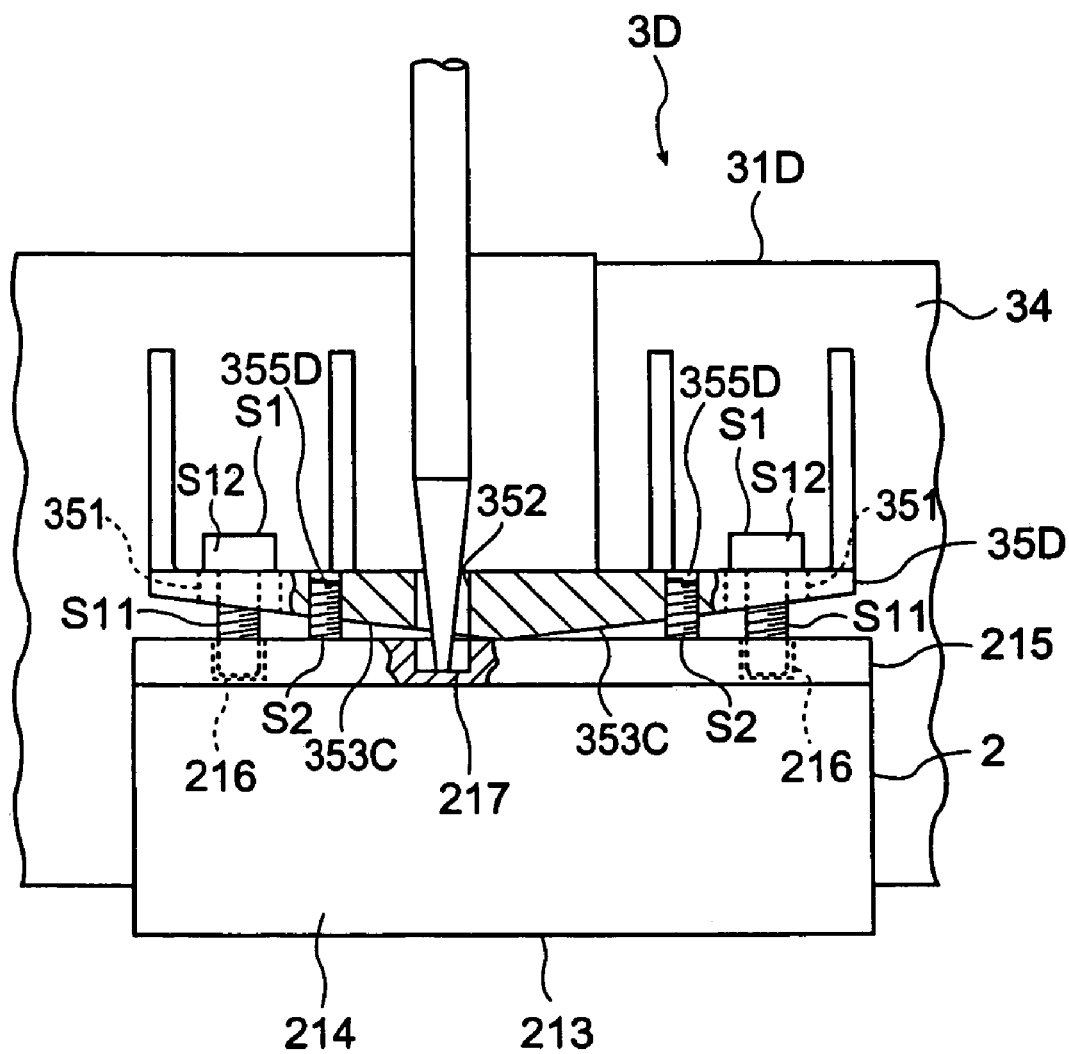
FIG. 14 is a side view showing the principal portion of the enclosure for optical components and the projection lens according to a fourth exemplary embodiment of the invention.

Referring to FIG. 12 and FIG. 13, a third exemplary embodiment of the invention will be described. A projection lens 3C of the present embodiment includes a lens barrel 31C formed of resin or the like and having a predetermined optical path set therein and a plurality of lenses (not shown) to be disposed on the illumination axis of the optical path in the lens barrel 31C in sequence as in the case of the projection lens 3.

The lens barrel 31C includes the cylindrical portion 34 as in the previous embodiments, and a pair of flanges 35C extending horizontally from the cylindrical portion 34.

The flanges 35C have a rectangular shape in plan view when viewing the projection lens 3C from above, and each are formed with the pair of elongated holes 351 as in the previous embodiments. The flanges 35C are formed with notches 352 as in the previous embodiments at the centers thereof.

Furthermore, the lower surfaces of the flanges 35C (the surfaces opposing to the supporting portions 215C of the enclosure for optical components 2C) is formed with a pair of inclined surfaces 353C inclining downward (toward the supporting portion 215C) from the front and rear ends of the projection lens 3C in the direction of projection toward the center of the lower surface. Also, a projection 354C projecting downward is also formed at the center of the lower surface.

The enclosure for optical components 2C has substantially the same structure as the enclosure for optical components 2 in the first embodiment, and the only point which is different therefrom is that recesses 218C are formed on the supporting portions 215C at the position corresponding to the projections 354C on the inclined surfaces 353C of the flanges 35C of the projection lens 3C.

Between the supporting portions 215C of the enclosure for optical components 2C and the flanges 35C of the projection lens 3C as described above, there are provided a pair of spacers 7 respectively. As shown in FIG. 13, the spacer 7 has a substantially wedge shape, and has a substantially trapezoidal shape in cross-section. The surface of the spacer 7 has an inclined surface 71 opposing to the inclined surface 353C of the flange 35C, and the surface on the opposite side from the inclined surface 71 is a horizontal surface 72 parallel with the supporting portion 215C.

The pairs of spacers 7 as described above are installed at the front end in the direction of projection and at the rear end in the direction of projection between the supporting portions 215c and the flanges 35C so as to oppose to each other. Since the spacers 7 are installed in the vicinity of the lower surface of the elongated holes 351 of the projection lens 3C, the spacers 7 are formed with notches 73 so as to avoid interference with the screwing shafts S11 of the fixing screws S1 which are inserted into the elongated holes 351 of the projection lens 3C.

The postural adjustment and fixation of the projection lens 3C can be performed in the following manner. First, adhesive agent (not shown), for example, UV-cured adhesive agent, is applied on the inclined surfaces 71 of the spacers 7. Subsequently, by the use of the device 5 (see FIG. 6) as in the first embodiment, a projection image from the projection lens 3C is projected on the rear screens 52. Based on the projection image from the projection lens 3C, the spacers 7 are moved to achieve the postural adjustment of the projection lens 3C in the tilting direction. In this case, adjustment can be achieved by inclining the projection lens 3C or changing the level of the projection lens 3C by adjusting the positions of the pairs of spacers 7. For example, when only the spacers 7 installed on the front end in the direction of projection are moved toward the rear end in the direction of projection, the front end of the projection lens 3C in the direction of projection is directed upward. In this case, the inclination of the projection lens 3C can be adjusted about the projections 354C of the projection lens 3C.

Also, when the pair of spacers 7 are moved uniformly, only the level of the projection lens 3C can be adjusted without changing the inclination thereof.

When the postural adjustment in the tilting direction is completed, the UV-cured adhesive agent applied on the spacer 7 is allowed to cure, so that the spacers 7 are secured to the flanges 35C.

Subsequently, adjustment of the back focus position of the projection lens 3C is performed based on the projection image from the projection lens 3C. Since the adjustment of the back focus position of the projection lens 3C is the same as in the first embodiment, the description thereof will be omitted. When performing the adjustment of the back focus position, the projections 354C of the projection lens 3C move in the recesses 218C in the supporting portions 215C.

According to the third exemplary embodiment as described above, the following effects are achieved in addition to substantially the same effects as (5-1)–(5-11) in the first embodiment. The level and inclination of the projection lens 3C can be adjusted and the postural adjustment of the projection lens 3C in the tilting direction can be achieved by providing the spacers 7 having a substantially wedge shape between the flanges 35C of the projection lens 3C and the supporting portions 215C of the enclosure for optical components 2C and moving the spacers 7. Accordingly, variations in image surfaces of the projection lens 3C and deformation of the projection image can be eliminated, whereby the quality of the projection image can be improved.

Since the spacers 7 are adhered and fixed to the flanges 35C after the positional adjustment in the tilting direction is completed, and the spacers 7 and the projection lens 3C are integrally moved when adjusting the back focus position, the position of the projection lens 3C in the tilting direction is prevented from being displaced when adjusting the position of the back focus.

The lower surfaces of the flanges 35C of the projection lens 3C each include inclined surfaces 353C which incline downward toward the center of the lower surface thereof, and the front end in the direction of projection of the lower surface of the flange 35C and the rear end in the direction of projection thereof are positioned at a higher level than the center of the lower surface. Therefore, when performing the postural adjustment of the projection lens 3C in the tilting direction, even when the spacers 7 are moved to incline the projection lens 3C toward the front in the direction of projection or toward the rear in the direction of projection, the front ends in the direction of projection or the rear ends in the direction of projection of the flanges 35C of the projection lens 3C do not come in contact with the supporting portions 215C of the enclosure for optical components 2C. Accordingly, flexibility of adjustment of inclination of the projection lens 3 can be increased.

In the third exemplary embodiment, the postural adjustment of the projection lens 3C in the tilting direction is performed by installing the spacers 7 between the supporting portions 215C of the enclosure for optical components 2C and the flanges 35C of the projection lens 3C. In this embodiment, the posture adjustment in the tilting direction is performed by providing a push-screws S2 on a flanges 35D of a projection lens 3D. In this embodiment, the enclosure for optical components 2 as in the first exemplary embodiment can be used.

The projection lens 3D in the present embodiment includes a lens barrel 31D formed of resin or the like and having a predetermined optical path set therein and a plurality of lenses (not shown) to be disposed on the illumination axis of the optical path in this lens barrel 31D in sequence as in the case of the projection lens 3. The lens barrel 31D includes the cylindrical portion 34 as in the previous embodiments, and a pair of flanges 35D extending horizontally from the cylindrical portion 34. Each flange 35D has the substantially same structure as the flange 35C of the previous embodiment, and the only different point from the projection lens 3C in the third embodiment is that a pair of screw holes 355D are provided on each flange 35D and the push-screws S2 are screwed into the screw holes 355D. The flange 35D is not formed with the projection 354C. The screw holes 355D are formed on the front end in the direction of projection and the rear end in the direction of projection with the intermediary of the notch 352, respectively.

The push-screw S2 comes into abutment with the supporting portion 215 of the enclosure for optical components 2 at one end and is screwed into the screw hole 355D of the flange 35D at the other end. The fixing screw S1 to be inserted into the elongated hole 351 of the flange 35D serves as a drawing thread.

The postural adjustment and fixation of the projection lens 3D are performed in the following manner.

First, adjustment of the back focus position of the projection lens 3D is performed based on the projection image from the projection lens 3D according to the same manner as the first embodiment. In this case, the distal ends of the push-screws S2 are kept out of abutment with the supporting portions 215, and the heads S12 of the fixing screws S1 are kept out of engagement with the elongated holes 351 of the flange 35D. Then, adjustment of the back focus position is performed according to the same manner as in the first embodiment.

Subsequently, the postural adjustment of the projection lens 3D in the tilting direction is performed based on the projection image from the projection lens 3D.

The projecting amount of the push-screws S2 from the flanges 35D of the projection lens 3D and the screwing amount of the fixing screws S1 into the supporting portions 215 of the enclosure for optical components 2 are adjusted. For example, the height of the flanges 35D with respect to the supporting portions 215, that is, the height of the projection lens 3D can be increased by increasing the projecting amount of the push-screws S2 from the flanges 35D and reducing the screwing amount of the fixing screws S1 into the supporting portion 215.

Also, the front end of the projecting lens 3D in the direction of projection is directed upward by increasing the projecting amount of the push-screws S2 provided on the front end in the direction of projection from the flanges 35D and reducing the screwing amount of the fixing screws S1 provided at the front end in the direction of projection into the supporting portions 215, for example.

In this manner, the distal ends of the push-screws S2 are brought into abutment with the supporting portions 215C and the heads S12 of the fixing screws S1 are brought into engagement with the elongated holes 351 of the flanges 35D while performing postural adjustment of the projection lens 3D in the tilting direction, and then the projection lens 3D is fixed to the enclosure for optical components 2.

According to the fourth exemplary embodiment, as described above, the following effects are achieved in addition to the substantially same effects as described above.

The level of the flanges 35D from the supporting portions 215 and the inclination of the projection lens 3D can be adjusted by the projecting amount of the push-screws S2 from the flanges 35D and the screwing amount of the fixing screws S1 into the supporting portions 215. Accordingly, the postural adjustment of the projection lens 3D in the tilting direction can be achieved, and hence variations in image surfaces of the projecting images can be corrected.

In the present embodiment, since the adjustment in the tilting direction is performed by the projecting amount of the push-screws S2 from the flanges 35D and the screwing amount of the fixing screws S1 into the supporting portions 215, and hence the adjustment in the tilting direction can be achieved by screwing of the screws, the adjustment in the tilting direction can be achieved easily without using adhesive agent or the like.

It should be understood that the invention is not limited to the aforementioned exemplary embodiments, and modifications or improvements within the scope in which the object of the present invention can be achieved are included in the present invention.

Figure 15:
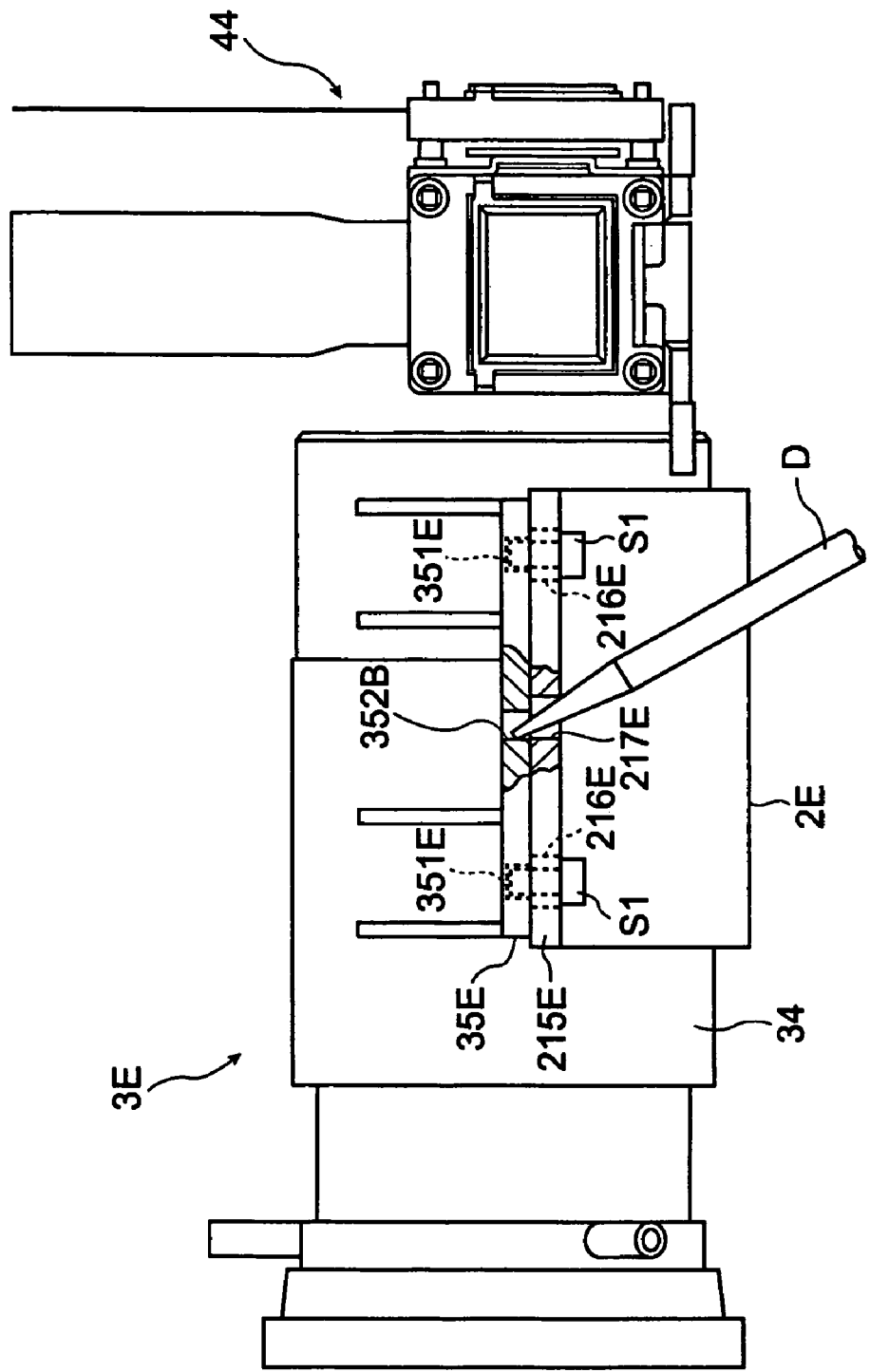
FIG. 15 is a side view of a modification of the present invention.

Although the grooves 217, 217B are formed on the supporting portions 215, 215B, 215C of the enclosures for optical components 2, 2B, 2C, and the notches 352 and the elongated holes 352B as pierced portions are formed on the flanges 35, 35B, 35C, 35D of the projection lenses 3, 3B, 3C, 3D in the aforementioned embodiments, it is also possible to form pierced portions 217E on supporting portions 215E of an enclosure for optical components 2E and grooves 352E on flanges 35E of a projection lens 3E as shown in FIG. 15. In this case, however, since it is necessary to insert the flat-head screwdriver D from below the supporting portions 215E, it takes a lot of trouble. Therefore, by employing the structure in which the flat-head screwdriver D can be inserted from the side of the flanges 35, 35B, 35C, 35D of the projections lenses 3, 3B, 3C, 3D as in the present embodiments, the postural adjustment can be facilitated.

Also, although the projector 1 having three liquid crystal panels is employed in the respective embodiments described above, it is not limited thereto, and a projector including two light modulating devices, or a projector having four or more liquid crystal panels may also be employed.

Furthermore, although the liquid crystal panel 441 is employed as a light modulating device in the respective embodiments described above, a light modulating device other than the liquid crystal, such as a device using a micro mirror, may be employed.

Furthermore, although only one notch 352 is formed on each flange 35, 35C, 35D and only one elongated hole 352B is formed on the flange 35B in the respective embodiments described above, it is also possible to form a plurality of notches or elongated holes thereon. In such a case, a plurality of flat-head screwdrivers may be used for performing the postural adjustment of the projection lenses 3, 3B, 3C, 3D.

Also, although the screw holes 216 for the fixing screws S1 are formed on the supporting portions 215, 215B, 215C in the embodiments described above, it is also possible to employ screw holes which penetrate the supporting portions. When employing such a structure, the fixing screws are fixed by allowing the screwing shafts of the fixing screws to project from the screw holes and mounting the nuts or the like at the distal ends of the screwing shafts.

Furthermore, although the screw holes 216 for fixing screws S1 are formed on the supporting portions 215, 215B, 215C and the elongated holes 351 in which the screwing shafts S11 of the fixing screws S1 are slid are formed on the flanges 35, 35B, 35C, 35D in the embodiments described above, it is also possible to form elongated holes 216E like the elongated holes 351 on the supporting portions 215E, and screw holes 351E like the screw holes 216 on the flanges 35E as shown in FIG. 15. In this case, the fixing screws S1 are to be inserted from the side of the supporting portions 215E. When allowing the flanges 35E to slide on the supporting portions 215E, the fixing screws S1 are moved together with the flanges 35.

Although the lower surfaces of the flanges 35D of the projection lens 3D are formed into the inclined surfaces in the fourth embodiment, it is also possible to form the same into a flat horizontal surface. By forming the lower surfaces of the flanges into the flat surfaces, formation of the flanges can be facilitated.

What is claimed is:

1. An optical apparatus, comprising:
   an electric optical device having a light modulating device that modulates a plurality of colored lights according to image information and a color combining system that combines colored lights modulated by the respective color modulating devices;
   a projection system that projects a luminous flux combined by the color combining system of the electric optical device in an enlarged manner and forms a projecting image;
   a base member having the electric optical device fixed thereon and the projection system mounted thereon;
   the projection system including a lens stored therein and a lens barrel having a flange extending outwardly and substantially orthogonal to the direction of the optical axis of the lens;
   the base member including a supporting portion extending along the flange of the lens barrel of the projection system and supporting the flange;
   one of the flange and the supporting portion being formed with a hole for inserting a screwing shaft of a screwing member that fixes the flange and the supporting portion and having a diameter larger than the diameter of the screwing shaft;
   one of the flange and the supporting portion being formed with a pierced portion penetrated from the surface opposing to the other one of the flange and the supporting portion to the surface on the opposite side and the other one of the flange and the supporting portion being formed with a groove which communicates with the pierced portion; and
   a rod-shaped adjusting member that is inserted into the pierced portion and the groove, the adjusting member coming into abutment with the pierced portion or the groove formed at least on the flange, and the flange sliding on the supporting portion.

2. The optical apparatus according to claim 1,
   the flange being formed with a pierced portion;
   the supporting portion being formed with a groove;
   the pierced portion having a width when viewed from a side of the front surface of the flange that is reduced toward the extending direction of the flange or toward the opposite direction therefrom; and
   the groove having a width when viewed from the side of the front surface of the flange that is reduced toward the direction opposite from the extending direction of the supporting portion or toward the extending direction thereof.

3. The optical apparatus according to claim 1,
   the flange being formed with a pierced portion; and
   the supporting portion being formed with a groove having a width along a direction of the optical axis of the projection system that is smaller than the width of the pierced portion along the direction of the optical axis of the projection system.

4. The optical apparatus according to claim 1,
   a substantially wedge-shaped spacer being interposed between the flange and the supporting portion of the base member.

5. The optical apparatus according to claim 1, comprising:
   a press-screw which comes into abutment with the supporting portion of the base member at one end and is to be screwed into a screw hole formed on the flange at the other end;
   the screwing member being a drawing thread that is screwed into a screw hole formed on the supporting portion of the base member at one end and engaged with the flange at the other end.

6. The optical apparatus according to claim 1,
   the surface of the flange opposing to the supporting portion of the base member including a pair of inclined surfaces inclining toward the supporting portion from a front end in the direction of projection and the rear end in the direction of projection of the opposing surface to the center thereof, respectively.

7. A projector, comprising:
   the optical apparatus according to claim 1.

8. A projector according to claim 7,
   the flange being formed with a pierced portion;
   the supporting portion being formed with a groove;
   the pierced portion having a width when viewed from a side of the front surface of the flange that is reduced toward the extending direction of the flange or toward the opposite direction therefrom; and
   the groove having a width when viewed from the side of the front surface of the flange that is reduced toward the direction opposite from the extending direction of the supporting portion or toward the extending direction thereof.

9. A projector according to claim 7,
   the flange being formed with a pierced portion; and
   the supporting portion being formed with a groove having a width along the direction of the optical axis of a projection system smaller than the width of the pierced portion along the optical axis of the projecting system.

10. A projector according to claim 7, comprising:
    a substantially wedge-shaped spacer interposed between the flange and the supporting portion of the base member.

11. A projector according to claim 7, comprising:
    a push-screw which comes into abutment with the supporting portion of the base member at one end and is screwed into the screw hole formed on the flange at the other end;
    the screwing member being a drawing thread that is screwed into the screw hole formed on the supporting portion of the base member at one end and engaged with the flange at the other end.

12. A projector according to claim 7,
    the surface of the flange opposing to the supporting portion of the base member including a pair of inclined surfaces inclining toward the supporting portion from the front end in the direction of projection and a rear end in the direction of projection of the opposing surface to a center thereof, respectively.

* * * * *